United States Patent
Merrill et al.

(10) Patent No.: US 12,321,839 B1
(45) Date of Patent: Jun. 3, 2025

(54) SYSTEMS AND METHODS FOR INTELLIGENT GENERATION AND ASSESSMENT OF CANDIDATE LESS DISCRIMINATORY ALTERNATIVE MACHINE LEARNING MODELS

(71) Applicant: Fairness-as-a-Service, Inc., Marina Del Rey, CA (US)

(72) Inventors: John Wickens-Lamb Merrill, Seattle, WA (US); Kareem Saleh, Marina Del Rey, CA (US); Mark Eberstein, Marina del Rey, CA (US)

(73) Assignee: Fairness-as-a-Service, Inc., Marina Del Rey, CA (US)

( * ) Notice: Subject to any disclaimer, the term of this patent is extended or adjusted under 35 U.S.C. 154(b) by 0 days.

(21) Appl. No.: 19/046,748

(22) Filed: Feb. 6, 2025

Related U.S. Application Data

(63) Continuation-in-part of application No. 18/741,000, filed on Jun. 12, 2024, now Pat. No. 12,248,858.

(60) Provisional application No. 63/648,890, filed on May 17, 2024, provisional application No. 63/537,941, filed on Sep. 12, 2023, provisional application No. 63/521,971, filed on Jun. 20, 2023.

(51) Int. Cl.
    *G06N 20/00* (2019.01)
    *G06N 20/20* (2019.01)

(52) U.S. Cl.
    CPC ................... *G06N 20/20* (2019.01)

(58) Field of Classification Search
    CPC .................................................... G06N 20/00
    See application file for complete search history.

(56) References Cited

U.S. PATENT DOCUMENTS

| | | | |
|---|---|---|---|
| 2020/0372472 A1* | 11/2020 | Kenthapadi | G06F 16/24578 |
| 2021/0287119 A1* | 9/2021 | Rink | G06Q 30/0201 |
| 2022/0114399 A1* | 4/2022 | Castiglione | G06V 10/751 |
| 2023/0105547 A1* | 4/2023 | Kamkar | G06Q 40/03 |
| | | | 705/38 |

FOREIGN PATENT DOCUMENTS

WO  WO-2022240860 A1 * 11/2022 ............. G06N 20/00

\* cited by examiner

*Primary Examiner* — Dave Misir
(74) *Attorney, Agent, or Firm* — Pdowithz Alce; Alce PLLC

(57) ABSTRACT

A system and method includes obtaining an incumbent model and a candidate model, generating a plurality of synthetic model input datasets, computing, for each synthetic model input dataset, a model performance efficacy metric and a model fairness efficacy metric for the incumbent model based on assessing model output data of the incumbent model that corresponds to each respective synthetic model input dataset of the plurality of synthetic model input datasets, computing, for each synthetic model input dataset, a model performance efficacy metric and a model fairness efficacy metric for the candidate model based on assessing model output data of the candidate model that corresponds to each respective synthetic model input dataset of the plurality of synthetic model input datasets, computing, for the candidate model, a disparity-mitigating model viability score, and displaying, via a graphical user interface, a representation of the candidate model in association with the disparity-mitigating model viability score.

18 Claims, 13 Drawing Sheets

200

Identifying an Incumbent Machine Learning Model S210

Identifying a Potential Set of Candidate Less Discriminatory Alternative Machine Learning Models S220

Generating Distinct Sets of Synthetic Data Samples using Bootstrapping Techniques S230

Assessing and Ranking Candidate Less Discriminatory Alternative Machine Learning Models S240

Surfacing a Ranking of Candidate Less Discriminatory Alternative Machine Learning Models S250

FIGURE 2

|  | Applicant Approval Rate | Fairness Efficacy Metric | | Subscriber-Defined Efficacy Metric | |
|---|---|---|---|---|---|
| Synthetic Dataset A | 47% | Incumbent Model | Candidate LDA A | Incumbent Model | Candidate LDA A |
| | | 75% | 80% | $25 | $30 |
| Synthetic Dataset B | 32% | Incumbent Model | Candidate LDA A | Incumbent Model | Candidate LDA A |
| | | 52% | 64% | $15 | $30 |
| Synthetic Dataset C | 60% | Incumbent Model | Candidate LDA A | Incumbent Model | Candidate LDA A |
| | | 25% | 40% | $50 | $65 |
| .... | .... | .... | .... | .... | .... |
| Synthetic Dataset N | 24% | Incumbent Model | Candidate LDA A | Incumbent Model | Candidate LDA A |
| | | 61% | 68% | $20 | $25 |

Table: Results for LDA Candidate A

FIGURE 9

|  | Applicant Approval Rate | Fairness Efficacy Metric | | Subscriber-Defined Efficacy Metric | |
|---|---|---|---|---|---|
| Synthetic Dataset A | 47% | Incumbent Model | Candidate LDA C | Incumbent Model | Candidate LDA C |
| | | 75% | 80% | $25 | $30 |
| Synthetic Dataset B | 32% | Incumbent Model | Candidate LDA C | Incumbent Model | Candidate LDA C |
| | | 83% | 68% | $30 | $15 |
| Synthetic Dataset C | 60% | Incumbent Model | Candidate LDA C | Incumbent Model | Candidate LDA C |
| | | 45% | 40% | $50 | $45 |
| .... | .... | .... | .... | .... | .... |
| Synthetic Dataset N | 24% | Incumbent Model | Candidate LDA C | Incumbent Model | Candidate LDA C |
| | | 61% | 59% | $25 | $20 |

Table: Results for LDA Candidate C

FIGURE 10

Obtaining, via one or more computers, an incumbent automated decisioning model and a candidate disparity-mitigating alternative model for the incumbent automated decisioning model

↓

Generating, via a resampling algorithm, a plurality of synthetic model input datasets based on providing a model input dataset to the resampling algorithm

↓

Based on generating the plurality of synthetic model input datasets:

Providing, as model input, each model input data sample of the plurality of synthetic model input datasets to the incumbent automated decisioning model and the candidate disparity-mitigating alternative model

↓

Computing, for each synthetic model input dataset, a model performance efficacy metric and a model fairness efficacy metric for the incumbent automated decisioning model based on individually assessing model output data of the incumbent automated decisioning model that corresponds to each respective synthetic model input dataset of the plurality of synthetic model input datasets

↓

Computing, for each synthetic model input dataset, a model performance efficacy metric and a model fairness efficacy metric for the candidate disparity-mitigating alternative model based on individually assessing model output data of the candidate disparity-mitigating alternative model that corresponds to each respective synthetic model input dataset of the plurality of synthetic model input datasets

↓

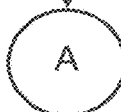

FIGURE 12

SYSTEMS AND METHODS FOR INTELLIGENT GENERATION AND ASSESSMENT OF CANDIDATE LESS DISCRIMINATORY ALTERNATIVE MACHINE LEARNING MODELS

CROSS-REFERENCE TO RELATED APPLICATIONS

This application is a Continuation-in-Part of U.S. patent application Ser. No. 18/741,000, filed, 12 Jun. 2024, which claims the benefit of U.S. Provisional Application No. 63/648,890, filed 17 May 2024, U.S. Provisional Application No. 63/537,941, filed 12 Sep. 2023, and U.S. Provisional Application No. 63/521,971, filed 20 Jun. 2023, which are incorporated in their entireties by this reference.

TECHNICAL FIELD

This invention relates generally to the machine learning training and machine learning optimization fields, and more specifically to a new and useful system and method in the machine learning training and machine learning optimization fields.

BACKGROUND

Various automated or semi-automated decisioning systems and the like may include machine learning algorithms that produce predictions that can inform or otherwise provide a substantial basis for one or more decisions output from these systems. Depending on the use case of an automated decisioning system, the machine learning algorithms may operate on input data from multiple distinct classes or categories of data. At least one technical problem that often persists in automated or semi-automated decisioning systems that use machine learning algorithms is that the algorithms may introduce or perpetuate undesired and/or unlawful disparity between the multiple classes or categories of data. That is, the machine learning algorithms as used in these decisioning systems may compute predictions that may be considered unfair towards one or more classes of data when compared to machine learning predictions computed for a control or dominant class of data.

The disparity of the predictions of the machine learning algorithms within automated decisioning systems can produce high disparity outcomes that adversely affect datasets in a minority or a non-dominant class or category.

In the present application, one or more implementations provide methods and systems for mitigating or minimizing disparity in predictions of these machine learning algorithms, per se, to improve the fairness of automated or semi-automated decisioning systems. One or more of the proposed technical solutions or techniques of the present application include a system and a method that enables simultaneous prediction distribution matching with several indiscernibility constraints that optimizes a learning of a target machine learning model towards indiscrimination between two or more classes of data underlying the prediction distributions.

Additionally, in such one or more implementations of the present application, the applications of methods like this may yield one or more machine learning models (i.e., candidate models) which may have disparities near to, or somewhat lower than, an original machine learning model (i.e., incumbent model). Therefore, determining which of the candidate models are 'better' than the incumbent model is not a trivial problem.

Thus, there is a need in the machine learning field to create improved new and useful systems and methods for identifying, determining and/or selecting a "best choice" from optimizing a training of one or more machine learning models for multiple criteria including indiscernibility between distinct classes of data and the like.

The embodiments of the present application described herein provide technical solutions that address, at least, the need described above.

BRIEF SUMMARY OF THE INVENTION(S)

In one embodiment, a computer-implemented method includes obtaining, via one or more computers, an incumbent automated decisioning model and a candidate disparity-mitigating alternative model for the incumbent automated decisioning model; generating, via a resampling algorithm, a plurality of synthetic model input datasets based on providing a model input dataset to the resampling algorithm; based on generating the plurality of synthetic model input datasets: (i) providing, as model input, each model input data sample of the plurality of synthetic model input datasets to the incumbent automated decisioning model and the candidate disparity-mitigating alternative model; computing, for each synthetic model input dataset, a model performance efficacy metric and a model fairness efficacy metric for the incumbent automated decisioning model based on individually assessing model output data of the incumbent automated decisioning model that corresponds to each respective synthetic model input dataset of the plurality of synthetic model input datasets; computing, for each synthetic model input dataset, a model performance efficacy metric and a model fairness efficacy metric for the candidate disparity-mitigating alternative model based on individually assessing model output data of the candidate disparity-mitigating alternative model that corresponds to each respective synthetic model input dataset of the plurality of synthetic model input datasets; and computing, for the candidate disparity-mitigating alternative model, a disparity-mitigating model viability score based on performing (1) a first set of pairwise assessments between the model performance efficacy metric computed for the incumbent automated decisioning model and the model performance efficacy metric computed for the candidate disparity-mitigating alternative model across the plurality of synthetic model input datasets and (2) a second set of pairwise assessments between the model fairness efficacy metric computed for the incumbent automated decisioning model and the model fairness efficacy metric computed for the candidate disparity-mitigating alternative model across the plurality of synthetic model input datasets; and displaying, via a graphical user interface, a representation of the candidate disparity-mitigating alternative model in association with the disparity-mitigating model viability score based on computing the disparity-mitigating model viability score for the candidate disparity-mitigating alternative model.

In one embodiment, an automated decisioning system includes the incumbent automated decisioning model, the computer-implemented method further includes: replacing the incumbent automated decisioning model with the candidate disparity-mitigating alternative model to mitigate bias in the automated decisioning system based on the disparity-mitigating model viability score computed for the candidate disparity-mitigating alternative model satisfying a minimum bias-mitigating efficacy value.

In one embodiment, the computer-implemented method further includes automatically generating, via the one or more computers, one or more pieces of evidence based on the disparity-mitigating model viability score computed for the candidate disparity-mitigating alternative model, wherein each piece of evidence of the one or more pieces of evidence includes a rationale describing a reason that the candidate disparity-mitigating alternative model outperforms the incumbent automated decisioning model with respect to bias mitigation, and displaying, via the graphical user interface, the one or more pieces of evidence to a subscriber associated with the incumbent automated decisioning model.

In one embodiment, the graphical user interface includes a selectable user interface element that, when selected, elects the candidate disparity-mitigating alternative model as a replacement or a successor to the incumbent automated decisioning model, the computer-implemented method further includes: receiving, via the graphical user interface, a user input selecting the selectable user interface element; in response to receiving the user input, identifying the candidate disparity-mitigating alternative model as the replacement or the successor to the incumbent automated decisioning model.

In one embodiment, the computer-implemented method further includes replacing the incumbent automated decisioning model with the candidate disparity-mitigating alternative model in response to receiving the user input.

In one embodiment, the graphical user interface is accessible by a subscriber associated with the incumbent automated decisioning model, the incumbent automated decisioning model is currently implemented or deployed in a production environment of the subscriber, and the graphical user interface enables the subscriber to determine whether replacement of the incumbent automated decisioning model with the candidate disparity-mitigating alternative model is needed.

In one embodiment, the disparity-mitigating model viability score computed for the candidate disparity-mitigating alternative model indicates that the candidate disparity-mitigating alternative model does not mitigate disparity or bias as effectively as the incumbent automated decisioning model, the subscriber forgoes executing a model replacement process based on the disparity-mitigating model viability score failing to satisfy a predetermined minimum disparity-mitigating model viability score threshold, and the model replacement process when executed replaces the incumbent automated decisioning model with the candidate disparity-mitigating alternative model.

In one embodiment, the disparity-mitigating model viability score computed for the candidate disparity-mitigating alternative model indicates that the candidate disparity-mitigating alternative model mitigates disparity or bias better than the incumbent automated decisioning model, the subscriber executes a model replacement process based on the disparity-mitigating model viability score satisfying a predetermined minimum disparity-mitigating model viability score threshold, and the model replacement process when executed replaces the incumbent automated decisioning model with the candidate disparity-mitigating alternative model.

In one embodiment, the resampling algorithm used for generating the plurality of synthetic model input datasets is encoded with a plurality of computer-executable instructions that, when executed, implements a statistical bootstrap method on the model input dataset, and each of the plurality of synthetic model input datasets was generated by sampling with replacement from the model input dataset.

In one embodiment, the model input dataset includes a plurality of model input data samples representative of real-world scenarios that the incumbent automated decisioning model has encountered or is likely to encounter in operation, each synthetic model input dataset of the plurality of synthetic model input datasets has a same number of data samples as the model input dataset, and each synthetic model input dataset of the plurality of synthetic model input datasets was constructed by sampling with replacement from the model input dataset.

In one embodiment, the incumbent automated decisioning model includes at least one machine learning model, wherein the incumbent automated decisioning model uses the at least one machine learning model to compute a distinct automated disposal decision for each distinct automated decisioning request transmitted to the incumbent automated decisioning model, and the candidate disparity-mitigating alternative model includes an adaptation of the at least one machine learning model.

In one embodiment, the incumbent automated decisioning model includes one or more heuristic-based automated decisioning protocols, wherein the incumbent automated decisioning model uses at least the one or more heuristic-based automated decisioning protocols to compute a distinct automated disposal decision for each distinct automated decisioning request transmitted to the incumbent automated decisioning model, and the candidate disparity-mitigating alternative model includes an adaptation of at least one of the one or more heuristic-based automated decisioning protocols.

In one embodiment, the plurality of synthetic model input datasets includes a first synthetic model input dataset, a second synthetic model dataset, and a third synthetic model input dataset, the computer-implemented method further includes: obtaining a first set of model output data computed by the incumbent automated decisioning model based on providing, as input, each model input data sample of the first synthetic model input dataset to the incumbent automated decisioning model; obtaining a second set of model output data computed by the incumbent automated decisioning model based on providing, as input, each model input data sample of the second synthetic model input dataset to the incumbent automated decisioning model; obtaining a third set of model output data computed by the incumbent automated decisioning model based on providing, as input, each model input data sample of the third synthetic model input dataset to the incumbent automated decisioning model; computing a first model performance efficacy metric and a first model fairness efficacy metric for the incumbent automated decisioning model based on assessing the first set of model output data computed by the incumbent automated decisioning model; computing a second model performance efficacy metric and a second model fairness efficacy metric for the incumbent automated decisioning model based on assessing the second set of model output data computed by the incumbent automated decisioning model; and computing a third model performance efficacy metric and a third model fairness efficacy metric for the incumbent automated decisioning model based on assessing the third set of model output data computed by the incumbent automated decisioning model.

In one embodiment, the computer-implemented further includes: obtaining a first set of model output data computed by the candidate disparity-mitigating alternative model based on providing, as input, each model input data sample of the first synthetic model input dataset to the candidate disparity-mitigating alternative model; obtaining a second set of model output data computed by the candidate disparity-mitigating alternative model based on providing, as input, each model input data sample of the second synthetic model input dataset to the candidate disparity-mitigating alternative model; obtaining a third set of model output data computed by the candidate disparity-mitigating alternative model based on providing, as input, each model input data sample of the third synthetic model input dataset to the candidate disparity-mitigating alternative model; computing a first model performance efficacy metric and a first model fairness efficacy metric for the candidate disparity-mitigating alternative model based on assessing the first set of model output data computed by the candidate disparity-mitigating alternative model; computing a second model performance efficacy metric and a second model fairness efficacy metric for the candidate disparity-mitigating alternative model based on assessing the second set of model output data computed by the candidate disparity-mitigating alternative model; and computing a third model performance efficacy metric and a third model fairness efficacy metric for the candidate disparity-mitigating alternative model based on assessing the third set of model output data computed by the candidate disparity-mitigating alternative model.

In one embodiment, performing the first set of pairwise assessments include: performing a first pairwise assessment between the first model performance efficacy metric computed for the incumbent automated decisioning model and the first model performance efficacy metric computed for the candidate disparity-mitigating alternative model, performing a second pairwise assessment between the second model performance efficacy metric computed for the incumbent automated decisioning model and the second model performance efficacy metric computed for the candidate disparity-mitigating alternative model; and performing a third pairwise assessment between the third model performance efficacy metric computed for the incumbent automated decisioning model and the third model performance efficacy metric computed for the candidate disparity-mitigating alternative model.

In one embodiment, performing the second set of pairwise assessments include: performing a first pairwise assessment between the first model fairness efficacy metric computed for the incumbent automated decisioning model and the first model fairness efficacy metric computed for the candidate disparity-mitigating alternative model, performing a second pairwise assessment between the second model fairness efficacy metric computed for the incumbent automated decisioning model and the second model fairness efficacy metric computed for the candidate disparity-mitigating alternative model; and performing a third pairwise assessment between the third model fairness efficacy metric computed for the incumbent automated decisioning model and the third model fairness efficacy metric computed for the candidate disparity-mitigating alternative model.

In one embodiment, a computer-program product embodied in a non-transitory machine-readable storage medium storing computer instructions that, when executed by one or more processors, includes obtaining, via one or more computers, an incumbent automated decisioning model and a plurality of candidate disparity-mitigating alternative models for the incumbent automated decisioning model; generating, via a resampling algorithm, a plurality of synthetic model validation datasets based on providing a model validation dataset as input to the resampling algorithm; based on generating the plurality of synthetic model validation datasets: (i) providing, as model input, each model validation data sample of the plurality of synthetic model validation datasets to the incumbent automated decisioning model and each of the plurality of candidate disparity-mitigating alternative models; (ii) computing, on a per-synthetic model validation dataset basis, a model performance efficacy metric and a model fairness efficacy metric for the incumbent automated decisioning model and each of the plurality of candidate disparity-mitigating alternative models based on assessing model output data that corresponds to each respective synthetic model validation dataset; and (iii) computing, for each candidate disparity-mitigating alternative model, a disparity-mitigating model viability score based on performing (1) a first set of pairwise assessments between the model performance efficacy metric computed for the incumbent automated decisioning model and the model performance efficacy metric computed for each candidate disparity-mitigating alternative model across the plurality of synthetic model validation datasets and (b) a second set of pairwise assessments between the model fairness efficacy metric computed for the incumbent automated decisioning model and the model fairness efficacy metric computed for each candidate disparity-mitigating alternative model across the plurality of synthetic model validation datasets; and surfacing, to a target user associated with the incumbent automated decisioning model, a disparity-mitigating effectiveness ranking of the plurality of candidate disparity-mitigating alternative models based on the disparity-mitigating model viability score computed for each candidate disparity-mitigating alternative model.

In one embodiment, a computer-program product embodied in a non-transitory machine-readable storage medium storing computer instructions that, when executed by one or more processors, perform operations includes: obtaining, via one or more computers, an incumbent automated decisioning model and a candidate disparity-mitigating alternative model for the incumbent automated decisioning model; generating, via a resampling algorithm, a plurality of synthetic model input datasets based on providing a model input dataset to the resampling algorithm; based on generating the plurality of synthetic model input datasets: (i) providing, as model input, each model input data sample of the plurality of synthetic model input datasets to the incumbent automated decisioning model and the candidate disparity-mitigating alternative model; (ii) computing, for each synthetic model input dataset, a model performance efficacy metric and a model fairness efficacy metric for the incumbent automated decisioning model based on individually assessing model output data of the incumbent automated decisioning model that corresponds to each respective synthetic model input dataset of the plurality of synthetic model input datasets; (iii) computing, for each synthetic model input dataset, a model performance efficacy metric and a model fairness efficacy metric for the candidate disparity-mitigating alternative model based on individually assessing model output data of the candidate disparity-mitigating alternative model that corresponds to each respective synthetic model input dataset of the plurality of synthetic model input datasets; and (iv) computing, for the candidate disparity-mitigating alternative model, a disparity-mitigating model viability score based on performing (1) a first set of pairwise assessments between the model performance efficacy metric computed for the incumbent automated decisioning model and the model performance efficacy metric computed for the candidate disparity-mitigating alternative model across a selective subset of the plurality of synthetic model input datasets and (2) a second set of pairwise assessments between the model fairness efficacy metric computed for the incumbent automated decisioning model and the model fairness efficacy metric computed for the candidate disparity-mitigating alternative model across the selective subset of the plurality of synthetic model input datasets; and displaying, via a graphical user interface, a representation of the candidate disparity-mitigating alternative model in association with the disparity-mitigating model viability score based on computing the disparity-mitigating model viability score for the candidate disparity-mitigating alternative model.

In one embodiment, the incumbent automated decisioning model is associated with a subscriber, and the selective subset of the plurality of synthetic model input datasets is less than a full size of the plurality of synthetic model input datasets, and the selective subset of the plurality of synthetic model input datasets corresponds to a target range of decisioning thresholds defined by the subscriber.

In one embodiment, the computer-program product further includes: in response to generating the plurality of synthetic model input datasets: automatically simulating, via the one or more computers, an estimated model performance and an estimated model fairness for the incumbent automated decisioning model and the candidate disparity-mitigating alternative model using the plurality of synthetic model input datasets.

In one embodiment, a computer-program product embodied in a non-transitory machine-readable storage medium storing computer instructions that, when executed by one or more processors, perform operations including: obtaining, via one or more computers, an incumbent automated decisioning model and a plurality of candidate disparity-mitigating alternative models for the incumbent automated decisioning model; generating, via a resampling algorithm, a plurality of synthetic model validation datasets based on providing a model validation dataset as input to the resampling algorithm; based on generating the plurality of synthetic model validation datasets: (i) automatically providing, as model input, each model validation data sample of the plurality of synthetic model validation datasets to the incumbent automated decisioning model and each of the plurality of candidate disparity-mitigating alternative models; (ii) automatically computing, on a per-synthetic model validation dataset basis, a model performance efficacy metric and a model fairness efficacy metric for the incumbent automated decisioning model and each of the plurality of candidate disparity-mitigating alternative models based on assessing model output data that corresponds to each respective synthetic model validation dataset; and (iii) automatically computing, for each candidate disparity-mitigating alternative model, a disparity-mitigating model viability score based on performing (1) a first set of pairwise assessments between the model performance efficacy metric computed for the incumbent automated decisioning model and the model performance efficacy metric computed for each candidate disparity-mitigating alternative model across the plurality of synthetic model validation datasets and (b) a second set of pairwise assessments between the model fairness efficacy metric computed for the incumbent automated decisioning model and the model fairness efficacy metric computed for each candidate disparity-mitigating alternative model across the plurality of synthetic model validation datasets; and automatically surfacing, to a target user associated with the incumbent automated decisioning model, a disparity-mitigating effectiveness ranking of the plurality of candidate disparity-mitigating alternative models based on the disparity-mitigating model viability score computed for each candidate disparity-mitigating alternative model.

In one embodiment, a computer-program product embodied in a non-transitory machine-readable storage medium storing computer instructions that, when executed by one or more processors, perform operations including: obtaining, via one or more computers, an incumbent automated decisioning model and a candidate disparity-mitigating alternative model for the incumbent automated decisioning model; automatically generating, via a resampling algorithm, a plurality of synthetic model input datasets based on providing a model input dataset to the resampling algorithm; in response to generating the plurality of synthetic model input datasets: (i) automatically providing, as model input, each model input data sample of the plurality of synthetic model input datasets to the incumbent automated decisioning model and the candidate disparity-mitigating alternative model; (ii) automatically computing, for each synthetic model input dataset, a model performance efficacy metric and a model fairness efficacy metric for the incumbent automated decisioning model based on individually assessing model output data of the incumbent automated decisioning model that corresponds to each respective synthetic model input dataset of the plurality of synthetic model input datasets; (iii) automatically computing, for each synthetic model input dataset, a model performance efficacy metric and a model fairness efficacy metric for the candidate disparity-mitigating alternative model based on individually assessing model output data of the candidate disparity-mitigating alternative model that corresponds to each respective synthetic model input dataset of the plurality of synthetic model input datasets; and (iv) automatically computing, for the candidate disparity-mitigating alternative model, a disparity-mitigating model viability score based on automatically performing (1) a first set of pairwise assessments between the model performance efficacy metric computed for the incumbent automated decisioning model and the model performance efficacy metric computed for the candidate disparity-mitigating alternative model across a selective subset of the plurality of synthetic model input datasets and (2) a second set of pairwise assessments between the model fairness efficacy metric computed for the incumbent automated decisioning model and the model fairness efficacy metric computed for the candidate disparity-mitigating alternative model across the selective subset of the plurality of synthetic model input datasets; and automatically displaying, via a graphical user interface, a representation of the candidate disparity-mitigating alternative model in association with the disparity-mitigating model viability score based on computing the disparity-mitigating model viability score for the candidate disparity-mitigating alternative model.

In one embodiment, a method of mitigating output bias in a computer-based decisioning system caused by an operation of an incumbent decisioning model, the method comprising at a model disparity mitigation service implemented by a network of distributed computers: sourcing, from a memory, an incumbent decisioning model of a computer-based decisioning system used in a production environment of a subscriber; identifying a plurality of distinct candidate disparity-mitigating decisioning models for mitigating an output bias of the computer-based decisioning system; executing, by one or more computer processors, output bias testing of the incumbent decisioning model and the plurality of distinct candidate disparity-mitigating decisioning models using a corpus of computer-generated synthetic data samples as bias testing input, wherein executing the output bias testing includes: computing, for each of the incumbent decisioning model and the plurality of distinct candidate disparity-mitigating decisioning models, at least a first model performance metric associated with a first objective function and at least a second model performance metric associated with a second objective function based on an input of the corpus of computer-generated synthetic data samples to the incumbent decisioning model and the plurality of distinct candidate disparity-mitigating decisioning models; computing, by the one or more computers, a two-dimensional value for each predictive output of the incumbent decisioning model and the plurality of distinct candidate disparity-mitigating decisioning models based on the first model performance metric and the second model performance metric; executing, by the one or more computers, a pairwise assessment between a first plurality of two-dimensional values for the incumbent decisioning model and a second plurality of two-dimensional values for at least one of the plurality of distinct candidate disparity-mitigating decisioning models, wherein the pairwise assessment includes identifying as a target pair a first two dimensional value of the first plurality of two-dimensional values and a second two-dimensional value of the second plurality of two-dimensional values that share a same bias testing input comprising a given synthetic data sample of the corpus of computer-generated synthetic data samples that was commonly inputted into the incumbent decisioning model and the at least one of the plurality of distinct candidate disparity-mitigating decisioning models; identifying a given candidate disparity-mitigating decisioning model of the plurality of distinct candidate disparity-mitigating decisioning models that, when executed, likely mitigates the output bias in the computer-based decisioning system; and outputting, by the one or more computer processors, a recommendation for adapting the computer-based decisioning system by replacing the incumbent decisioning model with the given candidate disparity-mitigating decisioning model thereby improving decisioning outputs of the computer-based decisioning system.

In one embodiment, the corpus of computer-generated synthetic data samples is generated by executing, by the one or more computers, a data synthesis algorithm configured to apply statistical sampling techniques that preserve distributional characteristics of fairness-sensitive attributes in the bias test input, wherein the data synthesis algorithm ensures representation of minority and majority class attributes in the corpus of computer-generated synthetic data samples.

In one embodiment executing the pairwise assessment includes comparing, by the one or more computer processors, the first two-dimensional value and the second two-dimensional value using a predefined metric computation rule that evaluates differences in prediction accuracy and bias mitigation between the incumbent decisioning model and the at least one of the plurality of distinct candidate disparity-mitigating decisioning models.

In one embodiment executing the pairwise assessment includes generating, via a graphical user interface, a graphical visualization, of the first plurality of two-dimensional values and the second plurality of two-dimensional values, wherein the graphical visualization overlays bias and performance trade-offs for the incumbent decisioning model and the at least one of the plurality of distinct candidate disparity-mitigating decisioning models.

In one embodiment, executing the pairwise assessment further includes computing, for each pairwise comparison, a model performance efficacy metric and a model fairness efficacy metric for the incumbent decisioning model and the at least one candidate disparity-mitigating decisioning model based on model output data corresponding to each synthetic model input dataset; identifying a subset of the pairwise comparisons in which the candidate disparity-mitigating decisioning model exhibits improved fairness efficacy without a statistically significant reduction in performance efficacy; and generating a graphical visualization of the subset of pairwise comparisons, wherein the graphical visualization overlays model fairness efficacy metrics and estimated benefit efficacy metrics illustrating the trade-offs between fairness improvement and decisioning model performance.

In one embodiment, executing the pairwise assessment further includes computing a divergence metric for each pairwise comparison between the first plurality of two-dimensional values and the second plurality of two-dimensional values, wherein the divergence metric comprises a Jensen-Shannon divergence metric computed between predictive output distributions of the incumbent decisioning model and the at least one of the plurality of distinct candidate disparity-mitigating decisioning models.

In one embodiment, identifying the given candidate disparity-mitigating decisioning model includes ranking the plurality of distinct candidate disparity-mitigating decisioning models based on a disparity-mitigating model viability score, wherein the disparity-mitigating model viability score is computed using the Jensen-Shannon divergence metric to compare probability distributions of predictive outputs between the incumbent decisioning model and each of the plurality of distinct candidate disparity-mitigating decisioning model; and identifying the given candidate disparity-mitigating decisioning model with a given disparity-mitigating model viability score that is highest as a most effective model for mitigating bias output in the computer-based decisioning system.

In one embodiment, the method further includes generating, by the one or more computer processors, a sensitivity digital artifact for each candidate disparity-mitigating decisioning model, wherein the sensitivity digital artifact quantifies variations in fairness metrics and performance metrics relative to changes in input data distribution, and using the sensitivity digital artifact to identify a robust candidate disparity-mitigating decisioning model with reduced susceptibility to input data variations.

In one embodiment, the recommendation for adapting the computer-based decisioning system includes generating a deployment readiness score based on model interpretability metrics and computational efficiency metrics, and ranking the plurality of distinct candidate disparity-mitigating decisioning models according to the deployment readiness score and outputting a ranked list of the plurality of distinct candidate disparity-mitigating decisioning models.

In one embodiment, a computer-implemented method for mitigating output bias in a computer-based decisioning system caused by an operation of an incumbent decisioning model includes receiving, by a processor, a model input dataset and an incumbent decisioning model deployed in a production environment; generating, by the processor, a plurality of synthetic datasets using a configured resampling algorithm stored in memory, wherein the resampling algorithm, when executed by the processor, applies statistical bootstrapping that preserve fairness-sensitive attributes of the model input dataset; executing, by the processor, the incumbent decisioning model and at least one candidate alternative decisioning model on one or more of the plurality of synthetic datasets to produce output predictions; computing, by the processor, at least one fairness metric and at least one performance metric for each of the incumbent decisioning model and the at least one candidate alternative decisioning model based on the output predictions, wherein the at least one fairness metric includes one or more of quantitative measures of adverse impact, disparate treatment, and classification parity; comparing, by the processor, the at least one fairness metric and the at least one performance metric of the incumbent decisioning model and the least one candidate alternative decisioning model using a pairwise computational framework that quantifies statistical bias deviations in predictive outputs; determining, by the processor, whether the least one candidate alternative decisioning model satisfies a predefined fairness improvement threshold while maintaining a minimum performance requirement; and transmitting, by the processor, a deployment recommendation signal to an automated system to replace the incumbent decisioning model with the at least one candidate alternative decisioning model when the fairness improvement threshold is satisfied.

In one embodiment, the plurality of synthetic datasets is generated by executing, by the processor, a data synthesis algorithm configured to apply statistical sampling techniques that preserve distributional characteristics of fairness-sensitive attributes in the model input dataset, and ensuring representation of minority and majority class attributes within the generated synthetic datasets to provide equitable bias testing inputs.

In one embodiment, comparing the least one fairness metric and the at least one performance metric includes using, by the processor, a predefined metric computation rule to evaluate differences in prediction accuracy and bias mitigation between the incumbent decisioning model and the at least one candidate alternative decisioning model.

In one embodiment, comparing the at least one fairness metric and the at least one performance metric includes generating, by the processor, a graphical visualization of trade-offs between bias mitigation and performance metrics for the incumbent decisioning model and the at least one candidate alternative decisioning model, wherein the graphical visualization overlays fairness and performance trade-offs to assist in model selection.

In one embodiment, the method further includes computing, for each pairwise comparison, a model performance efficacy metric and a model fairness efficacy metric for the incumbent decisioning model and the at least one candidate alternative decisioning model based on output predictions corresponding to the synthetic datasets; identifying a subset of pairwise comparisons where the candidate alternative decisioning model exhibits improved fairness efficacy without significant degradation in performance efficacy; and generating a graphical visualization of the identified subset of pairwise comparisons, overlaying fairness efficacy metrics and estimated performance trade-offs.

In one embodiment, comparing the at least one fairness metric and the at least one performance metric further includes computing, by the processor, a divergence metric for each pairwise comparison between the incumbent decisioning model and the at least one candidate alternative decisioning model, wherein the divergence metric includes a Jensen-Shannon divergence metric computed between the predictive output distributions.

In one embodiment, determining whether the at least one candidate alternative decisioning model satisfies the fairness improvement threshold includes ranking the candidate alternative decisioning models based on a disparity-mitigating model viability score, wherein the disparity-mitigating model viability score is computed using the Jensen-Shannon divergence metric to quantify statistical differences in predictive outputs, and identifying the candidate alternative decisioning model with the highest viability score for deployment.

In one embodiment, the method further includes generating, by the processor, a sensitivity digital artifact for each candidate alternative decisioning model, wherein the sensitivity digital artifact quantifies variations in fairness metrics and performance metrics relative to changes in the model input dataset distribution, and using the sensitivity digital artifact to identify a robust candidate alternative decisioning model with reduced susceptibility to input data variations.

In one embodiment, the deployment recommendation signal includes generating a deployment readiness score for the at least one candidate alternative decisioning model based on model interpretability metrics and computational efficiency metrics; and ranking the candidate alternative decisioning models according to the deployment readiness score and outputting a ranked list.

In one embodiment, a system for mitigating output bias in a computer-based decisioning system caused by an operation of an incumbent decisioning model, the system includes: a memory storing an incumbent decisioning model, a plurality of distinct candidate disparity-mitigating decisioning models, and a corpus of computer-generated synthetic data samples; a processor configured to: source, from the memory, the incumbent decisioning model deployed in a production environment of a subscriber;

identify the plurality of distinct candidate disparity-mitigating decisioning models for mitigating output bias in the computer-based decisioning system; execute output bias testing of the incumbent decisioning model and the plurality of distinct candidate disparity-mitigating decisioning models using the corpus of computer-generated synthetic data samples as bias testing input, wherein executing the output bias testing includes: computing, for each of the incumbent decisioning model and the plurality of distinct candidate disparity-mitigating decisioning models, at least a first model performance metric associated with a first objective function and at least a second model performance metric associated with a second objective function based on the input of the corpus of computer-generated synthetic data samples; computing a two-dimensional value for each predictive output of the incumbent decisioning model and the plurality of distinct candidate disparity-mitigating decisioning models based on the first model performance metric and the second model performance metric; execute a pairwise assessment between a first plurality of two-dimensional values for the incumbent decisioning model and a second plurality of two-dimensional values for at least one of the plurality of distinct candidate disparity-mitigating decisioning models, wherein the pairwise assessment includes identifying as a target pair a first two-dimensional value of the first plurality of two-dimensional values and a second two-dimensional value of the second plurality of two-dimensional values that share a same bias testing input comprising a given synthetic data sample; identify a given candidate disparity-mitigating decisioning model of the plurality of distinct candidate disparity-mitigating decisioning models that, when executed, likely mitigates the output bias in the computer-based decisioning system; and output a recommendation for adapting the computer-based decisioning system by replacing the incumbent decisioning model with the given candidate disparity-mitigating decisioning model to improve decisioning outputs of the computer-based decisioning system.

In one embodiment executing the pairwise assessment includes generating, via a graphical user interface, a graphical visualization, of the first plurality of two-dimensional values and the second plurality of two-dimensional values, wherein the graphical visualization overlays bias and performance trade-offs for the incumbent decisioning model and the at least one of the plurality of distinct candidate disparity-mitigating decisioning models, and wherein executing the pairwise assessment further includes: computing, for each pairwise comparison, a model performance efficacy metric and a model fairness efficacy metric for the incumbent decisioning model and the at least one candidate disparity-mitigating decisioning model based on model output data corresponding to each synthetic model input dataset; identifying a subset of the pairwise comparisons in which the candidate disparity-mitigating decisioning model exhibits improved fairness efficacy without a statistically significant reduction in performance efficacy; and generating a graphical visualization of the subset of pairwise comparisons, wherein the graphical visualization overlays model fairness efficacy metrics and estimated benefit efficacy metrics illustrating the trade-offs between fairness improvement and decisioning model performance.

BRIEF DESCRIPTION OF THE FIGURES

FIG. 2 illustrates an example method 200 in accordance with one or more embodiments of the present application;

FIGS. 9-10 illustrate example assessments of a subject candidate less discriminatory alternative machine learning model against a target incumbent machine learning model in accordance with one or more embodiments of the present application;

DESCRIPTION OF THE PREFERRED EMBODIMENTS

Figure 1:
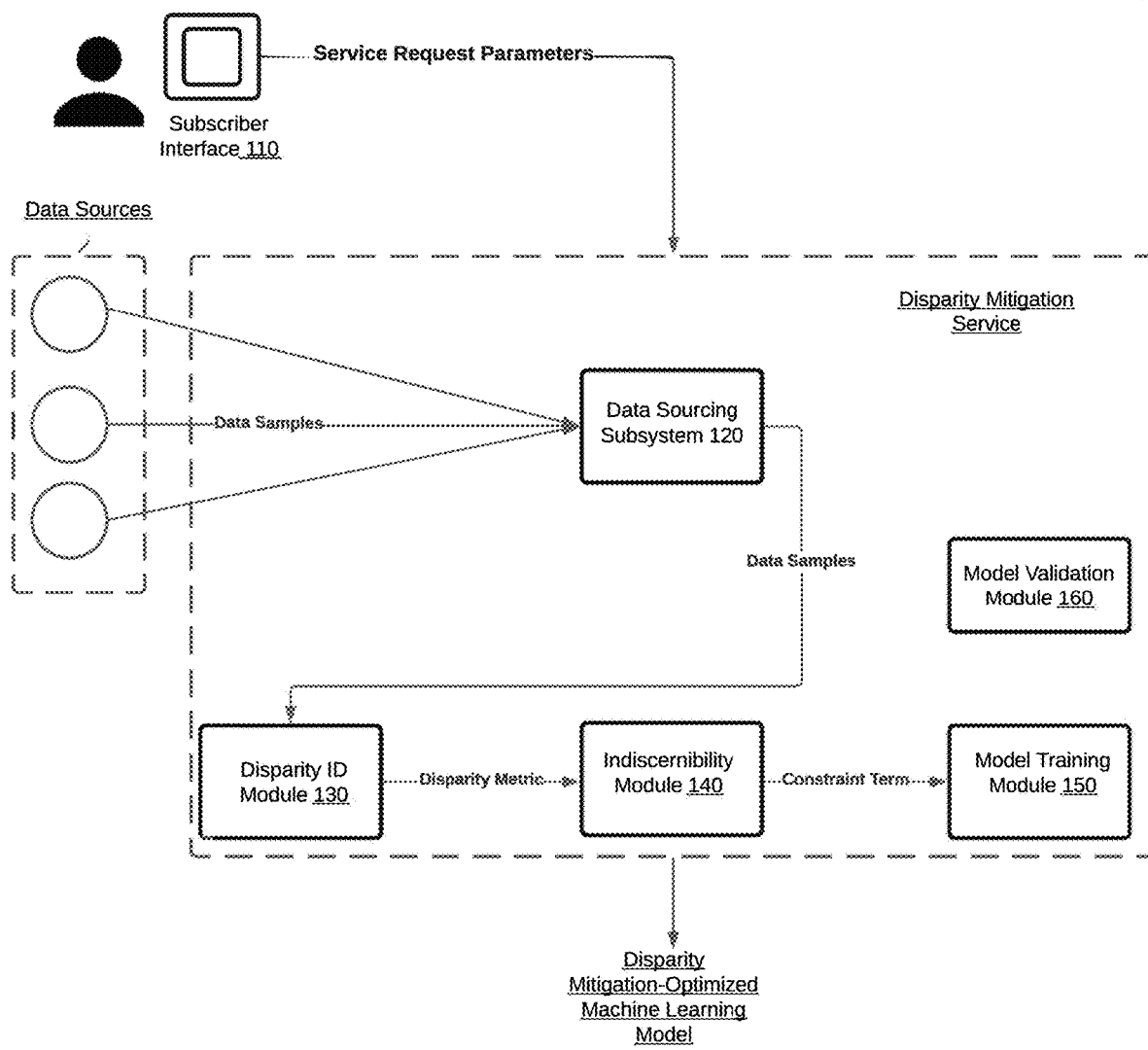
FIG. 1 illustrates a schematic representation of a system 100 in accordance with one or more embodiments of the present application.

The following description of the preferred embodiments of the invention is not intended to limit the inventions to these preferred embodiments, but rather to enable any person skilled in the art to make and use these inventions.

The systems, methods, computer program products, and embodiments described herein may be implemented in a variety of technology areas where mitigating bias in automated decisioning systems is critical. This includes, but is not limited to, machine learning-based automated decisioning systems, heuristics-based automated decisioning systems, and automated decisioning systems using any suitable combination of machine learning and heuristics.

As described in more detail herein, the systems, methods, computer program products, and embodiments may be configured to automatically simulate and assess the performance of a plurality of candidate disparity-mitigating alternative models generated for an incumbent automated decisioning model and, in turn, identify the "best" or "most optimal" candidate disparity-mitigating alternative model of the plurality of candidate disparity-mitigating alternative models that mitigates bias most effectively while maintaining or improving overall decisioning accuracy and fairness when compared to the incumbent automated decisioning model. Using the systems, methods, and computer program products, and embodiments in such a manner provides many technical advantages and benefits.

For instance, at least one technical advantage of some of the systems, methods, computer-program products, and embodiments described in the present application may include rapid or automated assessment of a plurality of candidate disparity-mitigating alternative models generated for an incumbent automated decisioning model. In other words, the systems, methods, computer-program products, and embodiments described herein may simultaneously assess, in bulk, tens, hundreds, or even thousands of candidate disparity-mitigating alternative models generated for a target incumbent automated decisioning model to identify the most effective disparity-mitigating alternative model. This allows subscribers to significantly reduce the time required to identify and implement the most effective disparity-mitigating alternative model.

Another technical advantage of some of the systems, methods, computer-program products, and embodiments described in the present application may include automatically simulating a model performance and a model fairness of an incumbent automated decisioning model and each candidate disparity-mitigating alternative model of a plurality of candidate disparity-mitigating alternative models generated for the incumbent automated decisioning model under a wide range of potential scenarios. In this way, the systems, methods, computer-program products, and embodiments may identify the most effective disparity-mitigating alternative model of the plurality of candidate disparity-mitigating alternative models that mitigates disparities across multiple disparity-affected classes, not just a single disparity-affected class.

Another technical advantage of some of the systems, methods, computer-program products, and embodiments described in the present application may include automatically generating a diverse range of synthetic model input datasets. In this way, based on receiving a model input dataset (e.g., original model input dataset, model validation dataset, or the like), the systems, methods, computer-program products, and embodiments may automatically create tens, hundreds, or even thousands of synthetic model input datasets through bootstrapping or other resampling techniques. Accordingly, each synthetic model input dataset (or each synthetic model input data sample of each synthetic model input dataset) may be provided as model input to both the incumbent automated decisioning model and each candidate disparity-mitigating alternative model of the plurality of candidate disparity-mitigating alternative models generated for the incumbent automated decisioning model to compute or evaluate a model performance and a model fairness for each respective model on each synthetic model input dataset.

Another technical advantage of some of the systems, methods, computer-program products, and embodiments described in the present application may include automatically conducting pairwise assessments on a per-synthetic model input dataset basis. By providing each synthetic model input dataset (or each synthetic model input data sample of each synthetic model input dataset) to both an incumbent automated decisioning model and each candidate disparity-mitigating alternative model of the plurality of candidate disparity-mitigating alternative models generated for the incumbent automated decisioning model, the systems, methods, computer-program products, and embodiments may be configured to obtain model output data that corresponds to each synthetic model input dataset and, in turn, automatically compute model performance and model fairness for each model (e.g., the incumbent automated decisioning model and each candidate disparity-mitigating alternative model of the plurality of candidate disparity-mitigating alternative models) on each synthetic model input dataset using the corresponding model output data. This enables pairwise assessments, where the model performance and model fairness of each candidate disparity-mitigating alternative model of the plurality of candidate disparity-mitigating alternative models may be automatically evaluated against those of the incumbent automated decisioning model on identical synthetic model input datasets.

Another technical advantage of some of the systems, methods, computer-program products, and embodiments described in the present application may include generating and surfacing, via a graphical user interface or the like, a prioritized ranking of the candidate disparity-mitigating alternative models. The prioritized ranking of the candidate disparity-mitigating alternative models may provide a visual representation (e.g., textually, graphically, combinations thereof, etc.) indicating how each candidate disparity-mitigating alternative models performed relative to the incumbent automated decisioning model. Thereby, significantly reducing the time and effort required to identify and/or select the most optimal candidate disparity-mitigating alternative model to replace an incumbent automated decisioning model.

Another technical advantage of a fairness service or fairness system implementing the systems, methods, computer-program products, and embodiments described in the present application may include automatically commencing a model performance and model fairness evaluation algorithm in response to receiving a model fairness evaluation request from a subscriber to the fairness service or fairness system. In this way, the model performance and model fairness evaluation algorithm may function automatically evaluate a model performance and model fairness of each candidate disparity-mitigation alternative model of a plurality of candidate disparity-mitigating alternative models with respect to a target incumbent automated decisioning model and, in turn, identify the most effective disparity-mitigating alternative model.

1. System for Model Disparity Mitigation and Training

As shown by reference to FIG. 1, a disparity mitigation system 100 for model disparity mitigation and training includes a subscriber interface 110, a data sourcing system 120, a disparity ID module 130, an indiscernibility constraint generation module 140, a model training module 150, and a model validation module 160.

The disparity mitigation system 100 may preferably be implemented over a distributed network of computers that control the implementation of various disparity mitigation modules (software implemented using processing circuits and/or hardware) or computing components within the system 100 and the like. In one or more embodiments, the disparity mitigation system 100 may be implemented by a disparity mitigation service that may operate to provide model disparity mitigation services for remote subscribers to the service. Additionally, or alternatively, the disparity mitigation service may be implemented to mitigate disparity in predictions between distinct classes for any suitable type or kind of machine learning algorithm or model, including but not limited to, any supervised, semi-supervised, and/or unsupervised artificial neural network.

The subscriber interface 110 may be provided as a client interface that may be in operable communication with one or more systems, modules, and/or components of the system 100. In one or more embodiments, the subscriber interface 110 may include a graphical user interface that enables a subscriber or user to interface with a service implementing the system 100. Using the subscriber interface 110, a user may provide one or more disparity mitigation parameters for optimizing a target machine learning model for disparity reduction, one or more corpora of data samples, one or more corpora of training and/or test data samples, a selection of hyperparameters and/or disparity-constraint parameters, and/or the like.

The data sourcing system 120 preferably functions to source data required for computing an indiscernibility constraint (as described below) and may be in operable communication with one or more sources of historical data samples and/or one or more corpora of training data samples for training a target machine learning model. The data sourcing system 120 may function to store any sourced corpora of data and make the stored corpora of data accessible to any system, component, and/or module of the system 100 including, but not limited to, the disparity ID module 130 and the model training module 150.

The disparity identification (ID) module 130 preferably functions to compute and/or identify disparity in predictions of a target machine learning model. In one or more embodiments, the disparity ID module 130 may function to generate distributions underlying data samples using one or more distribution generation techniques, such as kernel-density estimation or the like. Additionally, or alternatively the disparity ID module 130 may function to compute a disparity metric value, such as a Jensen-Shannon divergence, between at least two distributions. The disparity ID module 130 may preferably be in operable communication with at least the data sourcing system 120 and the indiscernibility constraint generation module 140.

The indiscernibility constraint generation module 140 preferably functions to generate an indiscernibility constraint term for a loss function of a target machine learning model. In one or more embodiments, the indiscernibility module 140 may be in operable communication with the disparity ID module 130 for obtaining one or more disparity metric values that may inform a computation of an indiscernibility constraint term.

Additionally, or alternatively, in one or more embodiments, the disparity mitigation system 100 may include a loss function generating module that may be integrated with the indiscernibility constraint generation module 140. In such embodiments, the loss function generating module may operate to create or generate a loss function that includes an indiscernibility constraint term for optimizing a target machine learning model.

The model training module 150 preferably functions to perform training operations for a target machine learning model having a disparity-constrained error function.

The model validation module 160 preferably functions to assess (e.g., measure and/or the like) a performance of one or more candidate less discriminatory alternative models (e.g., candidate less discriminatory alternative machine learning models, candidate disparity-mitigating alternative model, etc.) against a pre-specified incumbent model (e.g., pre-specified incumbent machine learning model, incumbent automated decisioning model, etc.). The performance of each of the one or more candidate less discriminatory alternative models against the performance of the pre-specified incumbent model may be compared against a predefined standard, such as, but not limited to, direct user input, some form of automatic assessment/selection criteria, and/or a combination thereof.

The model validation module 160, in one or more embodiments, may function to verify that a subject candidate less discriminatory alternative model is a less discriminatory alternative to the pre-specified incumbent model. Accordingly, in one or more embodiments, based on determining that at least a subset of the one or more candidate less discriminatory alternative models is a less discriminatory alternative to the pre-specified incumbent model, the model validation module 160 may function to select one of the candidate less discriminatory alternative models of the subset that optimizes for fairness and performance.

It should be recognized that, in some embodiments, one or more of the modules of the disparity mitigation system 100 may be combined and/or integrated with other modules. In a non-limiting example, the disparity ID module 130 may be combined with and/or fully integrated with the indiscernibility constraint generation module 140 as a single module that performs the entirety of the functions of both modules. Similarly, any of the modules described herein may be partitioned into distinct or sub-modules.

2. Method for Intelligently Assessing Candidate Less Discriminatory Alternative Machine Learning Models Against a Target Incumbent Machine Learning Model As shown by reference to FIG. 2, the method 200 for intelligently assessing candidate less discriminatory alternative machine learning models against an incumbent machine learning model may include identifying an incumbent machine learning model S210, identifying a potential set of candidate less discriminatory alternative machine learning models to the incumbent machine learning model S220, generating distinct sets of synthetic data samples using bootstrapping techniques S230, assessing and ranking candidate less discriminatory alternative machine learning models S240, and surfacing a ranking of candidate less discriminatory alternative machine learning models S250.

Figure 12:
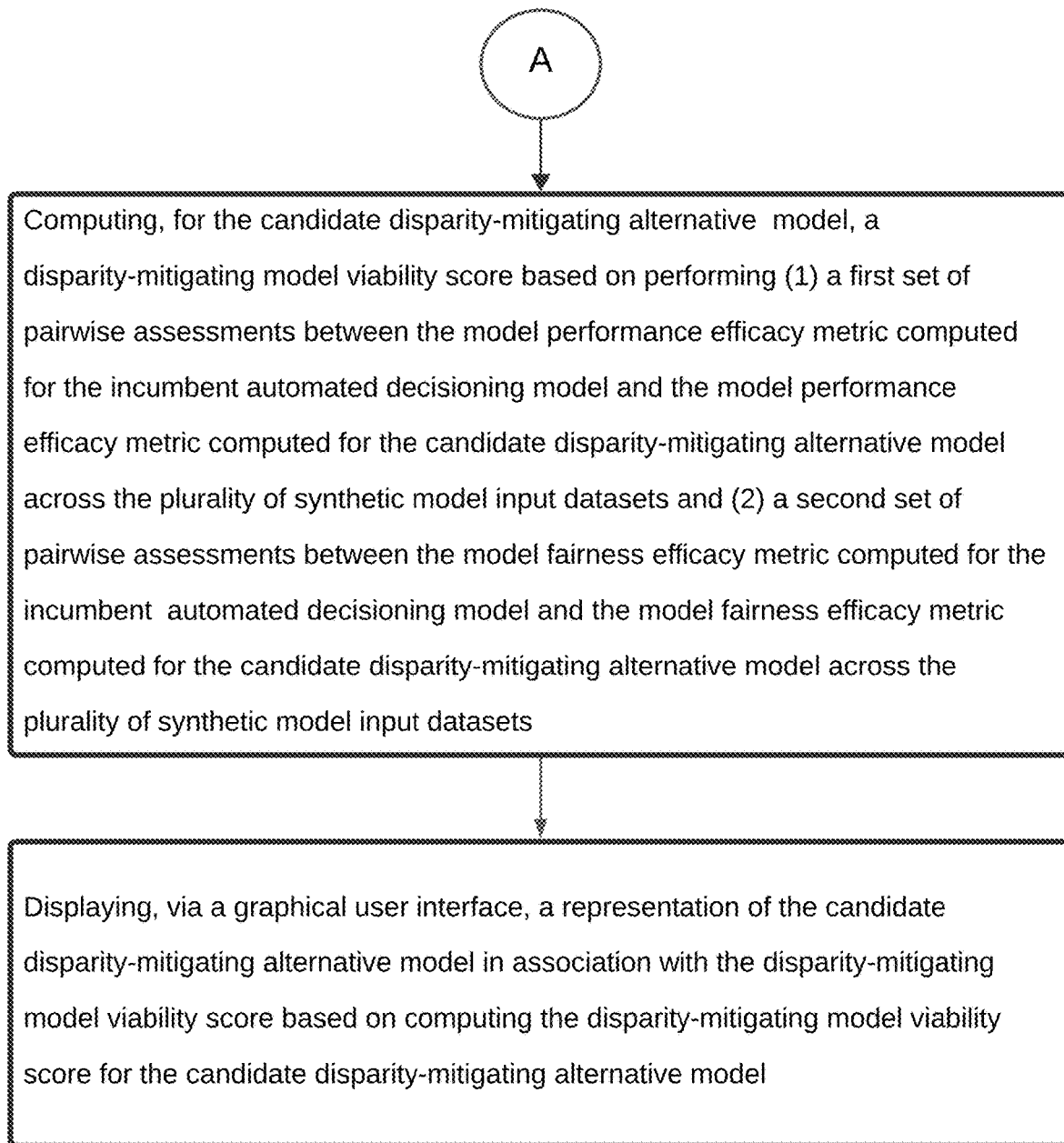
FIG. 12 illustrates an example method in accordance with one or more embodiments of the present application.

Additionally, or alternatively, as shown generally by way of example in FIG. 12, a system or service implementing method 200 may include obtaining, via one or more computers, an incumbent automated decisioning model and a candidate disparity-mitigating alternative model for the incumbent automated decisioning model, generating, via a resampling algorithm, a plurality of synthetic model input datasets based on providing a model input dataset to the resampling algorithm, providing, as model input, each model input data sample of the plurality of synthetic model input datasets to the incumbent automated decisioning model and the candidate disparity-mitigating alternative model, computing, for each synthetic model input dataset, a model performance efficacy metric and a model fairness efficacy metric for the incumbent automated decisioning model based on individually assessing model output data of the incumbent automated decisioning model that corresponds to each respective synthetic model input dataset of the plurality of synthetic model input datasets, computing, for each synthetic model input dataset, a model performance efficacy metric and a model fairness efficacy metric for the candidate disparity-mitigating alternative model based on individually assessing model output data of the candidate disparity-mitigating alternative model that corresponds to each respective synthetic model input dataset of the plurality of synthetic model input datasets, computing, for the candidate disparity-mitigating alternative model, a disparity-mitigating model viability score based on performing a first set of pairwise assessments between the model performance efficacy metric computed for the incumbent automated decisioning model and the model performance efficacy metric computed for the candidate disparity-mitigating alternative model across the plurality of synthetic model input datasets and a second set of pairwise assessments between the model fairness efficacy metric computed for the incumbent automated decisioning model and the model fairness efficacy metric computed for the candidate disparity-mitigating alternative model across the plurality of synthetic model input datasets, and displaying, via a graphical user interface, a representation of the candidate disparity-mitigating alternative model in association with the disparity-mitigating model viability score based on computing the disparity-mitigating model viability score for the candidate disparity-mitigating alternative model.

2.10 Identifying an Incumbent Machine Learning Model

S210, which includes identifying an incumbent machine learning-model, may function to identify or obtain a machine learning model of a subscriber that may be implemented or under evaluation for deployment in a production environment of the subscriber. An incumbent machine learning model, as generally referred to herein, may be a currently utilized or operational machine learning model that performs a specific task or action within a subject subscriber's system. It shall be noted that the phrase "incumbent machine learning model" may also be referred to herein as an "automated decisioning machine learning model" and the like.

In one or more embodiments, based on receiving a production-implemented machine learning model and/or the like from a subject subscriber, S210 may function to identify, tag and/or label the production-implemented machine learning model as an incumbent machine learning model. As will be described in more detail herein, a system or service implementing the method 200 may use the incumbent machine learning model as a baseline (e.g., benchmark, standard, etc.) when assessing a potential set of candidate less discriminatory alternative machine learning models.

For instance, in a non-limiting example, S210 may function to identify and/or receive, from a subscriber, an incumbent machine learning model that may be configured to receive user data of a prospective user as input and generate, as output, a machine learning-based inference that either approves or declines the prospective user based on the user data of the prospective user.

Additionally, or alternatively, in such a non-limiting, S210 may function to identify and/or receive, from a subscriber, an incumbent machine learning model that may be configured to receive user data of a prospective user as input and generate, as output, a machine learning-based inference that classifies the prospective user into one of a plurality of distinct classes.

Additionally, or alternatively, in such a non-limiting, S210 may function to identify and/or receive, from a subscriber, an incumbent machine learning model that may be configured to receive applicant data of a prospective applicant as input and generate, as output, a machine learning-based inference that includes an interest rate (APR) value that may be based on the applicant data of the prospective applicant.

Stated another way, in one or more embodiments, S210 may function to receive, obtain, and/or access a machine learning model (e.g., an incumbent machine learning-based automated decisioning system, an incumbent machine learning-based automated decisioning model, etc.) that may be currently deployed in a production environment of a subject subscriber and used to generate machine learning-based inferences that reduces a probability of the subject subscriber engaging in an adverse event (e.g., adverse transaction event) with a prospective user (e.g., prospective applicant).

It shall be recognized, in one or more embodiments, a machine learning model (e.g., an incumbent machine learning model and the like) obtained, received and/or identified by S210 may be trained to have a set of weights and biases that balances model performance with respect to model fairness.

It shall be further recognized that S210 may function to identify additional incumbent machine learning models, fewer incumbent machine learning models, and/or different incumbent machine learning models without departing from the scope of the disclosure.

Additionally, or alternatively, in one or more embodiments, S210 may function to obtain, receive, and/or access, via one or more computers, an incumbent automated decisioning model (e.g., a machine learning-based automated decisioning model, a heuristics-based automated decisioning model, an automated decisioning system using one or more automated decisioning machine learning models and/or one or more automated decisioning heuristics, etc.) that may be implemented or under evaluation for deployment in a production environment of the subscriber. The incumbent automated decisioning model, in one or more embodiments, may assist the subscriber with performing or computing automated decisioning tasks. Accordingly, based on or in response to obtaining the incumbent automated decisioning model, S210 may function to identify, tag and/or label the incumbent automated decisioning model as an "incumbent" in analogous ways as described above.

Additional Incumbent Types

In one or more embodiments, as an alternative to obtaining an incumbent machine learning model (e.g., incumbent automated decisioning machine learning model, etc.), S210 may function to obtain, receive, and/or identify incumbent decisioning procedures in analogous ways as described above. For instance, in a non-limiting example, S210 may function to identify and/or obtain one or more classes of incumbent decisioning procedures, including, but not limited to, credit score box cuts (i.e., a method of categorizing individuals based on credit scores), actuarial techniques, fraud detection systems, presence of an applicant on the Office of Financial Access Control Sanctions List (the 'OFAC List'), and/or any other suitable non-model based decisioning procedures.

Additionally, or alternatively, in one or more embodiments, S210 may function to receive or obtain an (incumbent) set of score data and/or an (incumbent) set of decision data from a subject subscriber. That is, in one or more embodiments, S210 may function to receive raw data associated with an incumbent decisioning system rather than a mechanism for computing a set of inferences.

Stated differently, in one or more embodiments, S210 may function to receive one or more of data (e.g., score data, output data, decision data, etc.) associated with an incumbent automated decisioning system, an incumbent automated decisioning machine learning model, one or more incumbent automated decisioning processes either in isolation or in combination with an incumbent machine learning model, and/or any suitable combination thereof in analogous ways described above.

Figure 3:
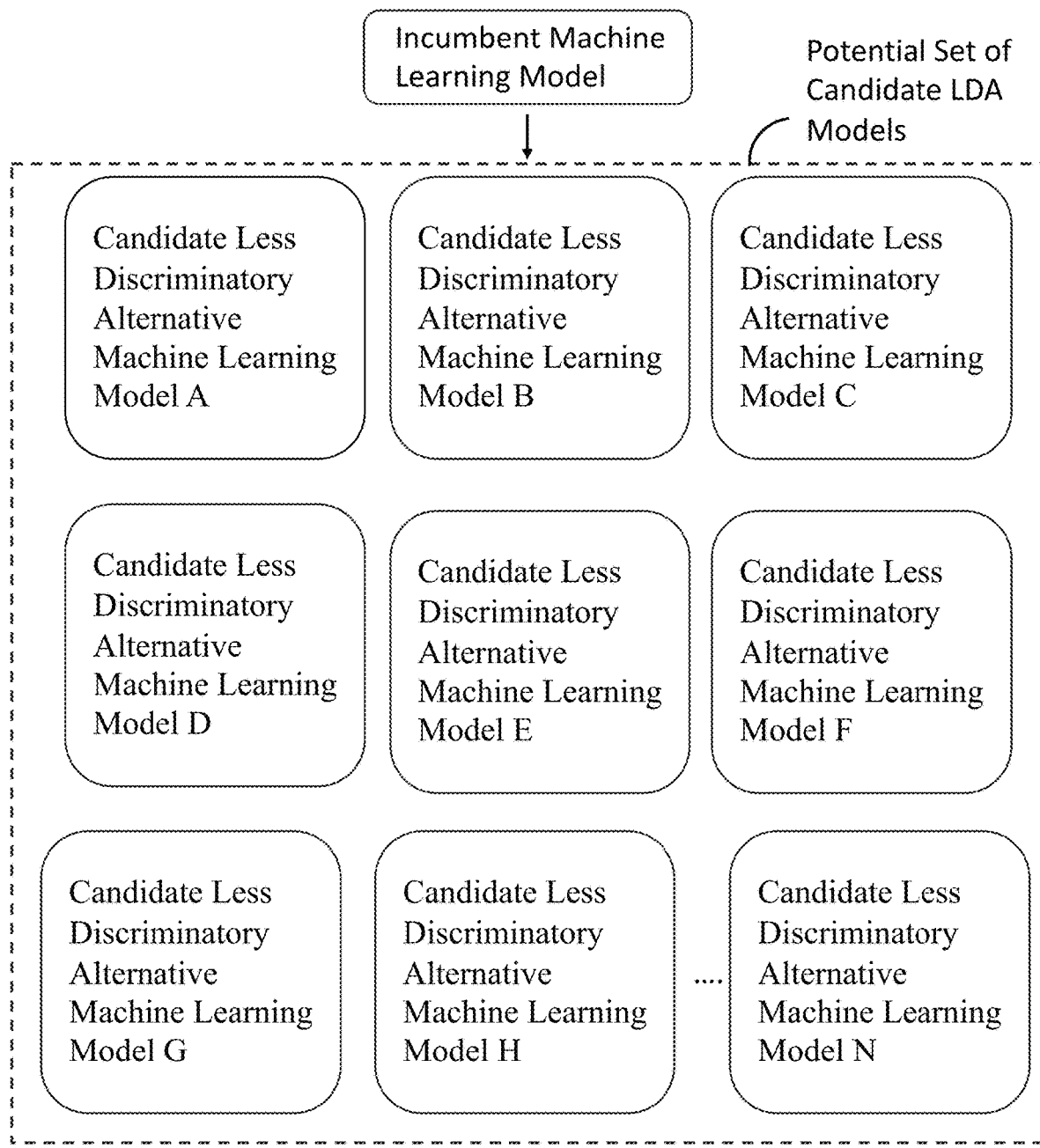
FIG. 3 illustrates a schematic representation of a plurality of candidate less discriminatory alternative machine learning models associated with a target incumbent machine learning model in accordance with one or more embodiments of the present application.
Figure 4:
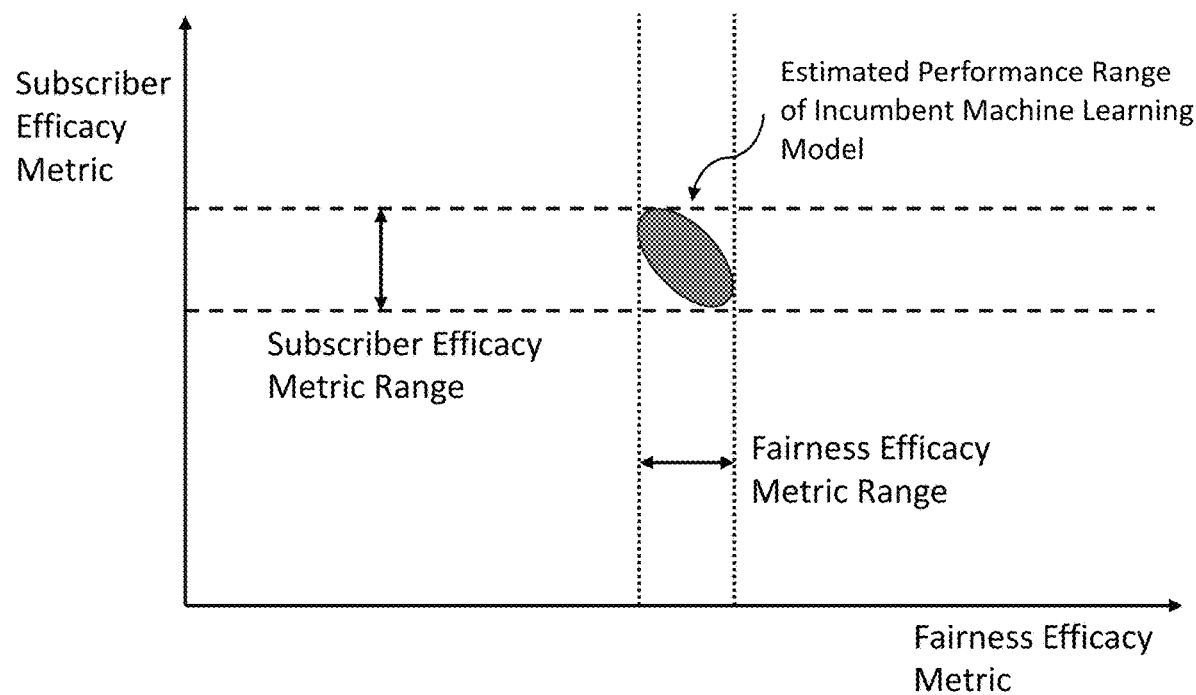
FIGS. 4-5 illustrate an example estimated performance range of an incumbent machine learning model in accordance with one or more embodiments of the present application.
Figure 5:
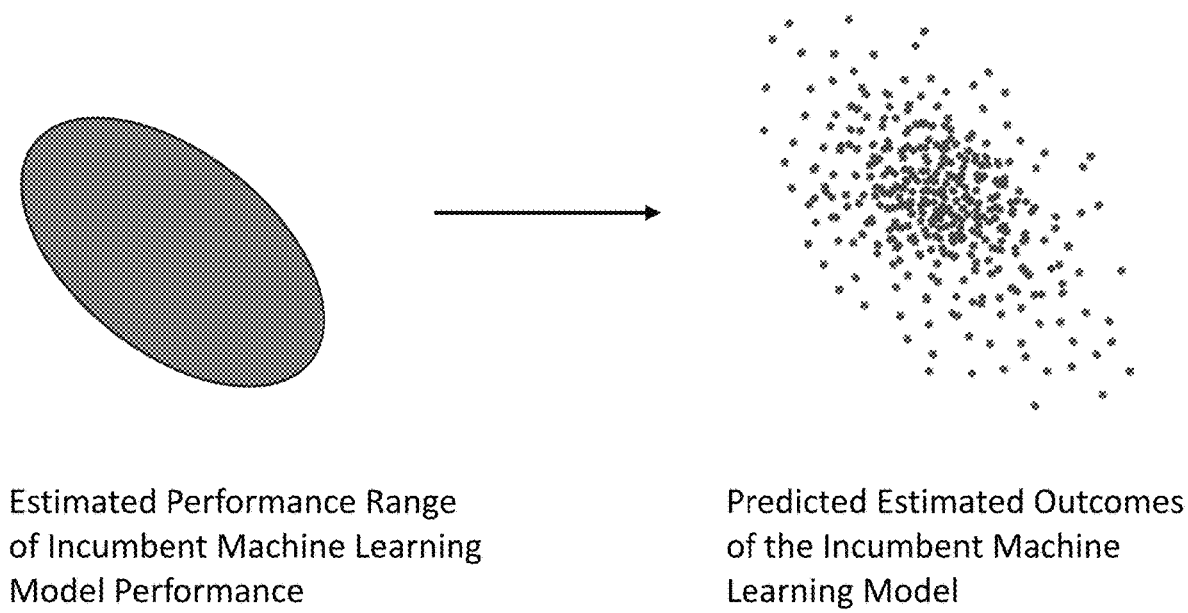
Figure 6:
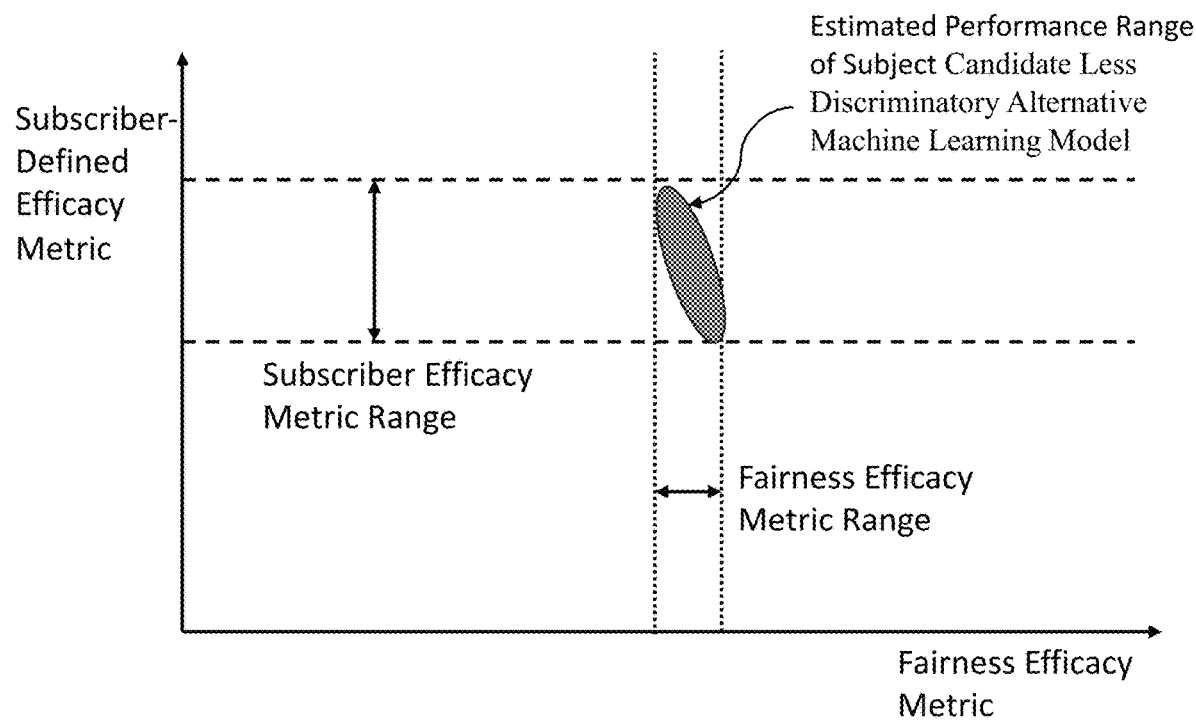
FIGS. 6-7 illustrate an example estimated performance range of a subject candidate less discriminatory alternative machine learning model in accordance with one or more embodiments of the present application.
Figure 7:
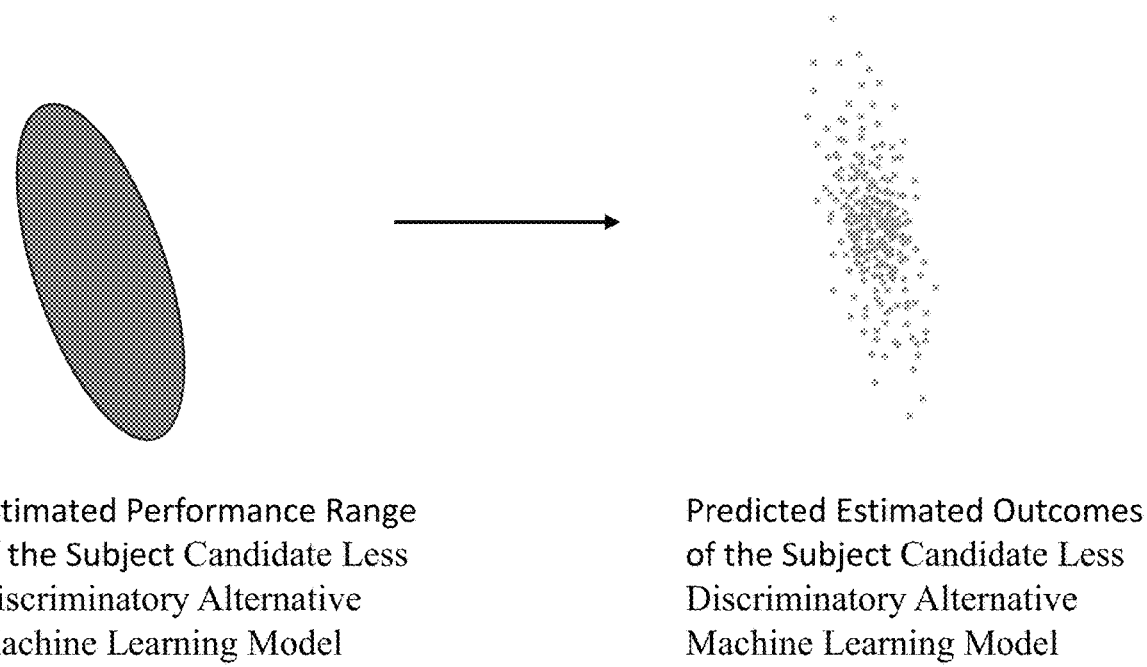

2.20 Identifying a Potential Set of Candidate Less Discriminatory Alternative Machine Learning Models S220, which includes identifying a potential set of candidate less discriminatory alternative (LDA) machine learning models, may function to obtain or generate a potential set of candidate less discriminatory alternative machine learning models to the incumbent machine learning model, as shown generally by way of example in FIG. 3. A candidate less discriminatory alternative machine learning model (i.e., candidate LDA model) to a target incumbent machine learning model may be configured or at least attempt to minimize bias and/or minimize disparity in model predictions that adversely affects one or more minority classes or one or more non-dominant classes while maintaining one or more target subscriber-specific efficacy metrics. It shall be recognized that a "candidate less discriminatory alternative model" may also be interchangeably referred to herein as a "challenger less discriminatory alternative machine learning model", a "candidate discrimination-mitigating machine learning model", and/or the like.

Generating a Potential Set of Candidate LDA Machine Learning Models

Optionally, in some embodiments, S220 may function to generate a potential set of candidate less discriminatory alternative machine learning models to a target incumbent machine learning model, as described in U.S. patent application Ser. No. 18/075,297 titled DISPARITY MITIGATION IN MACHINE LEARNING-BASED PREDICTIONS FOR DISTINCT CLASSES OF DATA USING DERIVED INDISCERNIBILITY CONSTRAINTS DURING NEURAL NETWORK TRAINING, which is incorporated in its entirety by this reference.

For instance, in a non-limiting example, based on receiving a target incumbent machine learning model, S220 may function to generate a potential set of candidate less discriminatory alternative machine learning models to the target incumbent machine learning model using the model training module 150 of the disparity mitigation service (e.g., fairness service). In such a non-limiting example, S220 may function to generate a candidate less discriminatory alternative machine learning model to the target incumbent machine learning model based on training the target incumbent machine learning model with a disparity-mitigating loss function that includes an indiscernibility constraint configured to minimize a disparity between different classes of data during a training of the target incumbent machine learning model. Accordingly, a result or outcome of the training of the target incumbent machine learning model with the disparity-mitigating loss function may be a candidate less discriminatory alternative machine learning model.

Additionally, or alternatively, in one or more embodiments, S220 may function to generate n-number of candidate less discriminatory alternative machine learning models (e.g., ten (10) or more candidate less discriminatory alternative machine learning models, twenty (20) or more candidate less discriminatory alternative machine learning models, thirty (30) or more candidate less discriminatory alternative machine learning models, forty (40) or more candidate less discriminatory alternative machine learning models, fifty (50) or more candidate less discriminatory alternative machine learning models, sixty (60) or more candidate less discriminatory alternative machine learning models, seventy (70) or more candidate less discriminatory alternative machine learning models, eighty (80) or more candidate less discriminatory alternative machine learning models, ninety (90) or more candidate less discriminatory alternative machine learning models, one-hundred (100) or more candidate less discriminatory alternative machine learning models, or any suitable number of candidate less discriminatory alternative machine learning models) based on selecting n-number of Pareto-optimal machine learning models from the Pareto optimal frontier, as described in U.S. patent application Ser. No. 18/075,297 titled DISPARITY MITIGATION IN MACHINE LEARNING-BASED PREDICTIONS FOR DISTINCT CLASSES OF DATA USING DERIVED INDISCERNIBILITY CONSTRAINTS DURING NEURAL NETWORK TRAINING, which is incorporated in its entirety by this reference. It shall be noted that the Pareto optimal frontier may have been generated through a multi-objective optimization process that is configured to simultaneously optimize multiple objectives (e.g., each distinct loss function component of the disparity-mitigating loss function, minimizing prediction error while also minimizing disparity in model predictions across different classes of data and/or the like), thereby providing a likely set or range of optimized machine learning models (e.g., candidate less discriminatory alternative machine learning models) that can be selected based on target fairness and/or accuracy efficacy metric values and/or a range of target fairness and/or accuracy efficacy metric values.

Additionally, or alternatively, in one or more embodiments, S220 may function to automatically generate, via one or more computers, a plurality of candidate less discriminatory alternatives (e.g., a plurality of disparity-mitigating alternatives) for an incumbent automated decisioning model using any suitable discriminatory alternative generation algorithm, such as, but noted limited to an automated less discriminatory alternative (LDA) search algorithm, an automated LDA generation algorithm, or the like.

It shall be recognized that, in one or more embodiments, each candidate less discriminatory alternative machine learning model of the potential set of candidate less discriminatory alternative machine learning models may or may not actually be a less discriminatory alternative machine learning model when assessed and/or evaluated against a target incumbent machine learning model to which the potential set of candidate less discriminatory alternative machine learning models corresponds, as described in more detail herein. It shall be further recognized that, in one or more embodiments, at least a subset of the potential set of candidate less discriminatory alternative machine learning models may have disparities near to, greater than, or somewhat lower than, a target incumbent automated decisioning model.

Identifying a Potential Set of Candidate LDA Machine Learning Models

In one or more embodiments, S220 may function to identify a potential set of candidate less discriminatory alternative machine learning models to a target incumbent machine learning based on identifying, within a database storing a plurality of previously trained and/or previously generated candidate less discriminatory alternative machine learning models, a set of candidate less discriminatory alternative machine learning models that were specifically generated as alternatives to the target incumbent machine learning model. It shall be noted that, in some embodiments, S220 may function to obtain the set of candidate less discriminatory alternative machine learning models based on searching the database using a representation or identifier of the target incumbent machine learning model as a search parameter.

Stated another way, in one or more embodiments, S220 may function to identify a potential set of candidate less discriminatory alternative machine learning models that were specifically generated as alternatives to the target incumbent machine learning model based on accessing a database storing a plurality of previously trained and/or previously generated candidate less discriminatory alternative machine learning models. In such embodiments, each distinct candidate less discriminatory alternative machine learning model of the potential set of candidate less discriminatory alternative machine learning models may have a different model configuration (e.g., one or more additional model features, one or more fewer model features, different weights and bias, different machine learning model type, etc.) when compared to the target incumbent machine learning model.

For instance, in a non-limiting example, an incumbent automated decisioning model may include at least one machine learning model and a candidate disparity-mitigating alternative model generated for the incumbent automated decisioning model may include an adaptation of the at least one machine learning model.

In another non-limiting example, an incumbent automated decisioning model may include one or more heuristics-based automated decisioning protocols and a candidate disparity-mitigating alternative model generated for the incumbent automated decisioning model may include an adaptation of at least one of the one or more heuristics-based automated decisioning protocols.

It shall be further recognized that, in one or more embodiments, S220 may function to identify a set of candidate decisioning procedures (e.g., non-model based decisioning procedures (i.e., not machine learning-based decisioning models) to an incumbent in analogous ways.

It shall be further recognized that, in one or more embodiments, S220 may function to identify and/or obtain a plurality of candidate disparity-mitigating alternative models for an incumbent automated decisioning model in analogous ways as described above.

2.30 Generating Distinct Sets of Synthetic Data Samples Using Bootstrapping Techniques S230, which includes generating distinct sets of synthetic data samples, may function to generate one or more distinct sets of synthetic data samples using bootstrapping techniques. In one or more embodiments, S230 may function to generate a plurality of distinct sets of synthetic data samples by resampling a target dataset (e.g., an out-of-time dataset, an original model input dataset, a raw dataset, and the like) with replacement. It shall be recognized that, in one or more alternative embodiments, S230 may function to generate distinct sets of synthetic data samples using any suitable statistical resampling method, machine learning technique, or data augmentation method without departing from the scope of the disclosure.

In one or more embodiments, based on obtaining a model input dataset or the like, S230 may function to use a resampling algorithm that may be encoded with a plurality of computer-executable instructions that, when executed, implements a statistical bootstrap method on the model input dataset to generate a plurality of synthetic model input datasets. That is, in one or more embodiments, each synthetic model input dataset of the plurality of synthetic model input datasets may have been generated by sampling with replacement from the model input dataset. It shall be recognized, in one or more embodiments, the model input dataset may include a plurality of model input data samples that may be representative of real-world scenarios that the incumbent automated decisioning model has encountered or is likely to encounter in operation.

Obtaining a Ground-Truth Validation Dataset

In one or more embodiments, S230 may function to receive a ground-truth validation dataset (e.g., an out-of-time validation dataset, original dataset, model input dataset and/or the like) based on a subject subscriber associated with a target incumbent machine learning-model (or incumbent automated decisioning model) digitally uploading and/or digitally transmitting the ground-truth validation dataset to the disparity mitigation service. In such embodiments, a ground-truth validation dataset may include a plurality of data records that the target incumbent machine learning model has not been exposed to during model training. It shall be recognized that the ground-truth validation dataset may be a representation of at least a target subset of real-world situations or scenarios that the target incumbent machine learning model may encounter in operation.

For instance, in a non-limiting example, S230 may function to receive a ground-truth validation dataset of applicant pool data (e.g., user data, applicant data, etc.) that may include actual (e.g., real-world) applicant data of a plurality of demographic backgrounds, financial histories, creditworthiness assessments, and/or any other suitable piece of applicant data. That is, in one or more embodiments, each distinct data record or data sample of the ground-truth validation dataset may be associated with a set of attributes and/or features of a distinct applicant or user.

It shall be further noted, in one or more embodiments, the ground-truth validation dataset (e.g., model input dataset or the like) may include a plurality of model input data samples that corresponds to one or more target disparity-affected classes.

Synthetic Dataset Generation

In one or more embodiments, S230 may function to automatically generate a plurality of distinct synthetic datasets (e.g., one-hundred synthetic model input datasets, one-thousand synthetic model input datasets, five-thousand synthetic model input datasets, ten-thousand synthetic model input datasets, or any suitable number of synthetic model input datasets) by applying a statistical bootstrap method (or technique) on the ground-truth validation dataset (e.g., out-of-time validation dataset, original dataset, and/or the like). A statistical bootstrap method or technique, as generally described herein, refers to a statistical resampling method that involves random sampling with replacement from the ground-truth validation dataset.

In one or more embodiments, based on applying or executing the statistical bootstrap method on the ground-truth validation dataset, S230 may function to generate a predetermined number of synthetic datasets in accordance with a service-defined minimum synthetic dataset creation threshold value.

Figure 8:
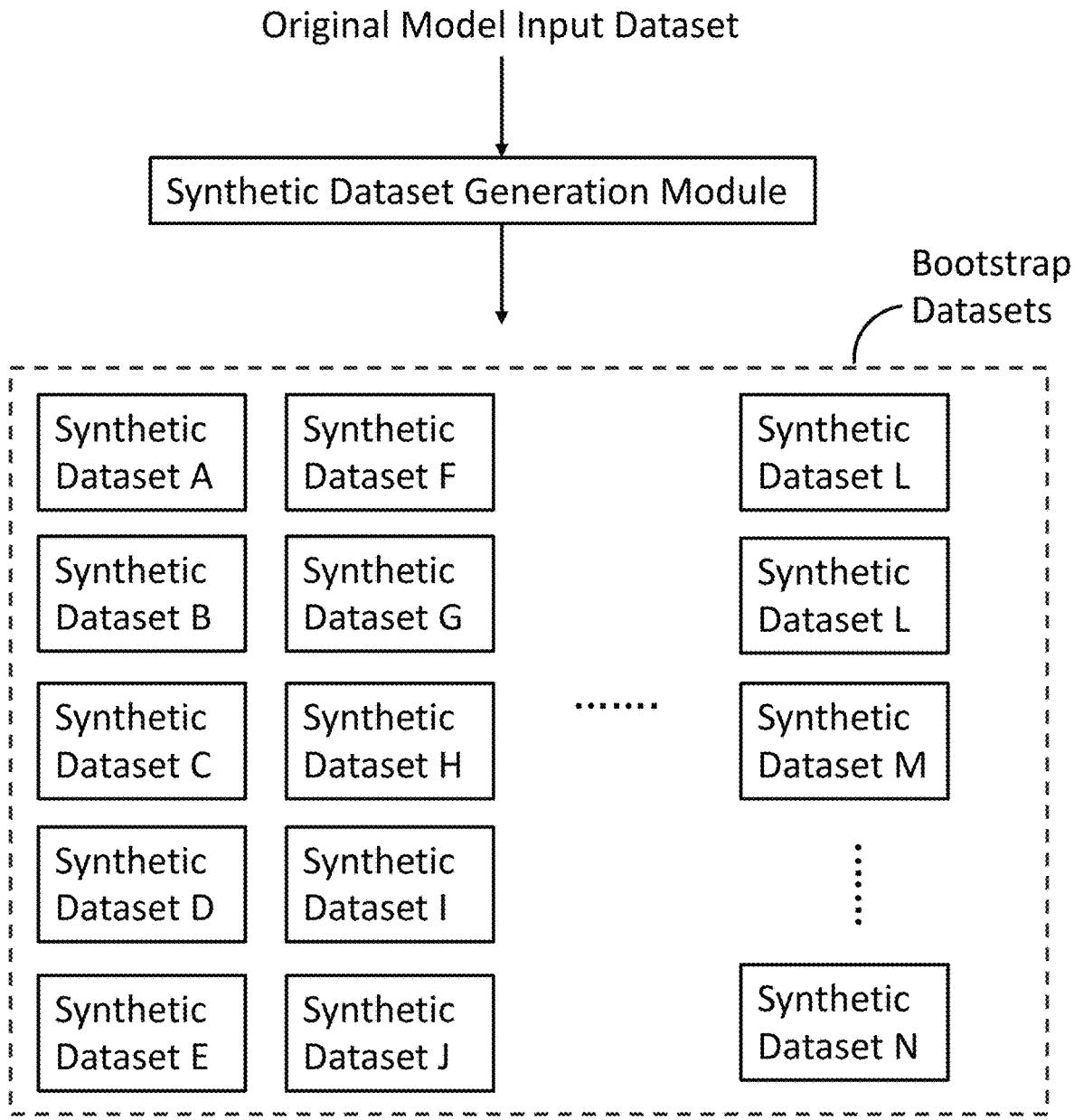
FIG. 8 illustrates an example schematic of generating a plurality of synthetic (model input) datasets based on an original (model input) dataset in accordance with one or more embodiments of the present application.

For instance, in a non-limiting example, S230 may function to apply (or execute) the statistical bootstrap method on an original or raw dataset of applicant data. Accordingly, based on applying (or executing) the statistical bootstrap method on the original or raw dataset of applicant data, a plurality of distinct synthetic datasets may be generated. For instance, in the non-limiting example of FIGS. 8-10, a subset of the plurality of distinct synthetic datasets may include a first synthetic dataset (i.e., synthetic dataset A) that may represent a specific applicant approval rate category or group (for example, an approval rate of forty-seven percent for applicants), a second synthetic dataset (i.e., synthetic dataset B) that may represent a different applicant approval rate category or group (for example, an approval rate of thirty-two percent for applicants), a third synthetic dataset (i.e., synthetic dataset C) that may represent another distinct applicant approval rate category or group (for example, an approval rate of sixty percent for applicants), and a fourth synthetic dataset (i.e., synthetic dataset N) that may represent another distinct applicant approval rate category or group (for example, an approval rate of twenty-four percent for applicants).

It shall be recognized, in such a non-limiting example, each distinct synthetic dataset of the plurality of distinct synthetic datasets may have a size equivalent to a size of the ground-truth validation dataset. For instance, in a non-limiting example, the ground-truth validation dataset may have twenty-thousand data samples and each synthetic dataset of the plurality of distinct synthetic datasets may have a size of twenty-thousand data samples.

It shall be further recognized that, in one or more embodiments, the plurality of distinct synthetic datasets generated by S230 may collectively form an estimated distribution of future activity that a service, system, automated decisioning model and/or machine learning model of the subscriber may encounter. At least one technical benefit of S230 generating the plurality of distinct synthetic datasets may enable a comprehensive assessment of the target incumbent machine learning model against a subject candidate less discriminatory alternative machine learning model across a range of plausible operating scenarios of the subscriber.

2.40 Assessing and Ranking Candidate LDA Machine Learning Models

S240, which includes assessing and ranking candidate less discriminatory alternative machine learning models, may function to assess and rank each candidate less discriminatory alternative machine learning model of the potential set of candidate less discriminatory alternative machine learning models provided by S220. In one or more embodiments, S240 may function to assess or evaluate each candidate less discriminatory alternative machine learning model of the potential set of candidate less discriminatory alternative machine learning models against the target incumbent machine learning model, as described in more detail herein. Stated another way, in one or more embodiments, S240 may function to automatically assess and rank, via one or more computers, each candidate disparity mitigating alternative model generated for an incumbent automated decisioning model.

Assessing Candidate LDA Machine Learning Models

In one or more embodiments, S240 may function to automatically evaluate a target incumbent machine learning model and each distinct candidate less discriminatory alternative machine learning model (of the potential set of candidate less discriminatory alternative machine learning models) on each distinct synthetic dataset generated by S230. At least one technical benefit of assessing a subject candidate less discriminatory alternative machine learning model against a target incumbent machine learning model on a per synthetic dataset basis may enable a comprehensive model performance assessment of the subject candidate less discriminatory alternative machine learning model against the target incumbent machine learning across a diverse range of synthetic datasets (e.g., synthetic model input datasets, etc.).

In one or more embodiments, based on S230 generating n-number of distinct synthetic datasets (e.g., n-number of synthetic model input datasets), S240 may function to perform a pairwise assessment between a model performance of a target incumbent automated decisioning model and a model performance of a subject candidate disparity-mitigating alternative model on a per synthetic dataset basis.

In one or more embodiments, based on S230 generating n-number of distinct synthetic model input datasets, S240 may function to perform n-number of pairwise assessments between a model performance of the target incumbent machine learning and a model performance of a subject candidate less discriminatory alternative machine learning model.

Additionally, or alternatively, in one or more embodiments, based on S230 generating n-number of distinct synthetic model input datasets, S240 may function to perform n-number of pairwise assessments between a model fairness of the target incumbent machine learning and a model fairness of a subject candidate less discriminatory alternative machine learning model.

For instance, in a non-limiting example, one of the n-number of distinct synthetic model input datasets generated by S230 may be a first synthetic model input dataset associated with a first class (e.g., a distinct disparity-affected class, non-disparity affected class) or distribution. In such embodiments, each distinct synthetic data sample or data record included in the first synthetic model input dataset may be provided, as model input, to both the target incumbent machine learning model and the subject candidate less discriminatory alternative machine learning model and output a respective machine learning-based inference, as shown generally by way of example in FIGS. 4-7. Accordingly, a model performance (e.g., a model performance efficacy metric) and a model fairness (e.g., a model fairness efficacy metric) of both the target incumbent machine learning model and the subject candidate less discriminatory alternative machine learning model on the first synthetic model input dataset may be assessed and/or computed based on their respective model outputs, as shown generally by way of example in FIG. 9.

Additionally, or alternatively, in such a non-limiting example, one of the n-number of distinct synthetic model input datasets generated by S230 may be a second synthetic model input dataset associated with a second class or distribution. In such embodiments, each distinct synthetic model input data sample or data record included in the second synthetic model input dataset may be provided, as model input, to both the target incumbent machine learning model and the subject candidate less discriminatory alternative machine learning model and output a respective machine learning-based inference. Accordingly, a model performance (e.g., a model performance efficacy metric) and a model fairness (e.g., a model fairness efficacy metric) of both the target incumbent machine learning model and the subject candidate less discriminatory alternative machine learning model on the second synthetic model input dataset may be assessed and/or computed based on their respective model outputs, as shown generally by way of example in FIG. 9.

Additionally, or alternatively, in such a non-limiting example, one of the n-number of distinct synthetic model input datasets generated by S230 may be a third synthetic model input dataset associated with a third distribution or class. In such embodiments, each distinct synthetic model input data sample or data record included in the third synthetic model input dataset may be provided, as model input, to both the target incumbent machine learning model and the subject candidate less discriminatory alternative machine learning model and output a respective machine learning-based inference. Accordingly, a model performance (e.g., a model performance efficacy metric) and a model fairness (e.g., a model fairness efficacy metric) of both the target incumbent machine learning model and the subject candidate less discriminatory alternative machine learning model on the third synthetic dataset may be assessed and/or computed based on their respective model outputs, as shown generally by way of example in FIG. 9.

Additionally, or alternatively, in such a non-limiting example, one of the n-number of distinct synthetic model input datasets generated by S230 may be the nth synthetic dataset associated with a nth distribution or class. In such embodiments, each distinct synthetic model input data sample or data record included in the nth synthetic model input dataset may be provided, as model input, to both the target incumbent machine learning model and the subject candidate less discriminatory alternative machine learning model and output a respective machine learning-based inference. Accordingly, a model performance (e.g., a model performance efficacy metric) and a model fairness (e.g., a model fairness efficacy metric) of both the target incumbent machine learning model and the subject candidate less discriminatory alternative machine learning model on the n-th synthetic model input dataset may be assessed and/or computed based on their respective model outputs when provided the same synthetic data samples or data records of nth synthetic dataset, as shown generally by way of example in FIG. 9.

It shall be recognized that, in one or more embodiments, the remaining candidate less discriminatory alternative machine learning models may be evaluated on the n-number of distinct synthetic model inputs datasets (e.g., the first synthetic dataset, the second synthetic dataset, the third synthetic dataset, the nth synthetic dataset, etc.) in analogous ways, as shown generally by way of example in FIG. 10.

Additionally, or alternatively, in one or more embodiments, a system or service implementing method 200 may function to generate, using a resampling algorithm, a plurality of synthetic model input datasets. In such embodiments, S230 may function to provide, as model input, each model input data sample (of the plurality of synthetic model input datasets) to a target incumbent automated decisioning model and each of a plurality of candidate disparity-mitigating alternative models generated for the target incumbent automated decisioning model. Accordingly, in one or more embodiments, S230 may function to obtain model output data for the target incumbent automated decisioning model and each of the plurality of candidate disparity-mitigating alternative models that corresponds to each respective synthetic model input dataset (e.g., obtaining model output data of the incumbent automated decisioning model that corresponds to a first synthetic model input dataset, obtaining model output data of a first candidate disparity-mitigating alternative model that corresponds to the first synthetic model input dataset, obtaining model output data of a second candidate disparity-mitigating alternative model that corresponds to the first synthetic model input dataset, obtaining model output data of a third candidate disparity-mitigating alternative model that corresponds to the first synthetic model input dataset, obtaining model output data of the incumbent automated decisioning model that corresponds to a second synthetic model input dataset, obtaining model output data of the first candidate disparity-mitigating alternative model that corresponds to the second synthetic model input dataset, obtaining model output data of the second candidate disparity-mitigating alternative model that corresponds to the second synthetic model input dataset, obtaining model output data of the third candidate disparity-mitigating alternative model that corresponds to the second synthetic model input dataset, etc.).

Computing Model Performance Efficacy Metrics

In one or more embodiments, based on obtaining model output data (e.g., model performance data) of the target incumbent machine learning model and a subject candidate less discriminatory alternative machine learning model on a subject synthetic dataset (e.g., subject synthetic model input dataset or the like), S240 may function to compute one or more model performance efficacy metrics based on the model output data.

For instance, with continued reference to the above non-limiting example, based on the target incumbent machine learning model and the subject candidate less discriminatory alternative machine learning model computing model output data (e.g., model performance data) based on the first synthetic model input dataset, S240 may function to compute a distinct set of model performance efficacy metrics based on the model output data that corresponds to the target incumbent machine learning model and a distinct set of model performance efficacy metrics based on the model output data that corresponds to the subject candidate less discriminatory alternative machine learning model.

In such a non-limiting example, the distinct set of model performance efficacy metrics that corresponds to the target incumbent machine learning model may include a model fairness efficacy metric (e.g., adverse impact ratio (AIR) or the like) and an estimated benefit (or performance) efficacy metric (e.g., model performance efficacy metric, profit or the like) and the distinct set of model performance efficacy metrics that corresponds to the subject candidate less discriminatory alternative machine learning model may include an analogous model fairness efficacy metric (e.g., adverse impact ratio or the like) and an analogous estimated benefit efficacy (or performance) metric (e.g., model performance efficacy metric, profit, area under the curve (AUC), or the like). Additionally, or alternatively, other model (fairness) efficacy metrics may be applicable including, but not limited to F-beta, denial odds ratio (DOR), demographic parity, equalized odds, predictive parity, causal fairness, false discovery rate (FDR), Matthews correlation coefficient (MCC), individual fairness, and/or the like may be applied. It shall be recognized that the list of possible model fairness efficacy metrics that may be used to evaluate a fairness or availability as a least discriminative alternative is not exhaustive and may be extensible to known model fairness efficacy metrics not explicitly listed herein. As shown generally by way of example in FIG. 9, in one or more embodiments of the non-limiting example, the target incumbent machine learning model may have performed on the first synthetic model input dataset with a model fairness efficacy metric of approximately seventy-five percent and an estimated benefit of twenty-five dollars and the subject candidate less discriminatory alternative machine learning model (e.g., the first candidate LDA Model of the potential set of candidate less discriminatory alternative (LDA) machine learning models) may have performed on the first synthetic dataset with a model fairness efficacy metric of approximately eighty percent and an estimated benefit of thirty dollars. In other words, the subject candidate less discriminatory alternative machine learning model performed better than the target incumbent machine learning model with respect to the first synthetic model input dataset.

Additionally, or alternatively, with continued reference to the above non-limiting example, based on the target incumbent machine learning model and the subject candidate less discriminatory alternative machine learning model computing model output data (e.g., model performance data) based on the second synthetic model input dataset, S240 may function to compute a distinct set of model performance efficacy metrics based on the model output data that corresponds to the target incumbent machine learning model and a distinct set of model performance efficacy metrics based on the model output data that corresponds to the subject candidate less discriminatory alternative machine learning model.

In such a non-limiting example, the distinct set of model performance efficacy metrics that corresponds to the target incumbent machine learning model may include a model fairness efficacy metric (e.g., adverse impact ratio or the like) and an estimated benefit efficacy metric (e.g., model performance efficacy metric, profit, area under the curve (AUC), or the like), and the distinct set of model performance efficacy metrics that corresponds to the subject candidate less discriminatory alternative machine learning model may include an analogous model fairness efficacy metric (e.g., adverse impact ratio or the like) and an analogous estimated benefit efficacy metric (e.g., model performance efficacy metric, profit or the like). As shown generally by way of example in FIG. 9, in one or more embodiments of the non-limiting example, the target incumbent machine learning model may have performed on the second synthetic model input dataset with a fairness efficacy metric of approximately fifty-two percent and an estimated benefit of fifteen dollars and the subject candidate less discriminatory alternative machine learning model (e.g., the first candidate LDA Model of the potential set of candidate less discriminatory alternative (LDA) machine learning models) may have performed on the second synthetic model input dataset with a model fairness efficacy metric of approximately sixty-four percent and an estimated benefit of thirty dollars (e.g., model performance efficacy metric). In other words, the subject candidate less discriminatory alternative machine learning model performed better than the target incumbent machine learning model with respect to the second synthetic model input dataset.

Additionally, or alternatively, with continued reference to the above non-limiting example, based on the target incumbent machine learning model and the subject candidate less discriminatory alternative machine learning model computing model output data (e.g., model performance data) based on the third synthetic model input dataset, S240 may function to compute a distinct set of model performance efficacy metrics based on the model output data that corresponds to the target incumbent machine learning model and a distinct set of model performance efficacy metrics based on the model output data that corresponds to the subject candidate less discriminatory alternative machine learning model.

In such a non-limiting example, the distinct set of model performance efficacy metrics that corresponds to the target incumbent machine learning model may include a model fairness efficacy metric (e.g., adverse impact ratio or the like) and an estimated benefit efficacy metric (e.g., model performance efficacy metric, profit or the like) and the distinct set of model performance efficacy metrics that corresponds to the subject candidate less discriminatory alternative machine learning model may include an analogous fairness efficacy metric (e.g., adverse impact ratio or the like) and an analogous estimated benefit efficacy metric (e.g., model performance efficacy metric, profit or the like). As shown generally by way of example in FIG. 9, in one or more embodiments of the non-limiting example, the target incumbent machine learning model may have performed on the third synthetic model input dataset with a model fairness efficacy metric of approximately twenty-five percent and an estimated benefit of fifty dollars and the subject candidate less discriminatory alternative machine learning model (e.g., the first candidate LDA Model of the potential set of candidate less discriminatory alternative (LDA) machine learning models) may have performed on the third synthetic model input dataset with a model fairness efficacy metric of approximately forty percent and an estimated benefit of sixty-five dollars. In other words, the subject candidate less discriminatory alternative machine learning model performed better than the target incumbent machine learning model with respect to the third synthetic dataset.

Additionally, or alternatively, with continued reference to the above non-limiting example, based on the target incumbent machine learning model and the subject candidate less discriminatory alternative machine learning model computing model output data (e.g., model performance data) based on the nth-synthetic model input dataset, S240 may function to compute a distinct set of model performance efficacy metrics based on the model output data that corresponds to the target incumbent machine learning model and a distinct set of model performance efficacy metrics based on the model output data that corresponds to the subject candidate less discriminatory alternative machine learning model.

In such a non-limiting example, the distinct set of model performance efficacy metrics that corresponds to the target incumbent machine learning model may include a model fairness efficacy metric (e.g., adverse impact ratio or the like) and an estimated benefit efficacy metric (e.g., model performance efficacy metric, AUC, profit or the like) and the distinct set of model performance efficacy metrics that corresponds to the subject candidate less discriminatory alternative machine learning model may include an analogous model fairness efficacy metric (e.g., adverse impact ratio or the like) and an analogous estimated benefit efficacy metric (e.g., model performance efficacy metric, AUC, profit or the like). As shown generally by way of example in FIG. 9, in one or more embodiments of the non-limiting example, the target incumbent machine learning model may have performed on the nth-synthetic model input dataset with a model fairness efficacy metric of approximately sixty-one percent and an estimated benefit of twenty dollars and the subject candidate less discriminatory alternative machine learning model (e.g., the first candidate LDA Model of the potential set of candidate less discriminatory alternative (LDA) machine learning models) may have performed on the nth-synthetic model input dataset with a model fairness efficacy metric of approximately sixty-eight percent and an estimated benefit of twenty-five dollars. In other words, the subject candidate less discriminatory alternative machine learning model performed better than the target incumbent machine learning model with respect to the nth-synthetic model input dataset.

Stated another way, in one or more embodiments, a system or service implementing method 200 may function to compute, for each synthetic model input dataset, a model performance efficacy metric (e.g., estimated model benefit, etc.) and a model fairness efficacy metric (e.g., adverse impact ratio, etc.) for a subject incumbent automated decisioning model based on individually assessing model output data of the subject incumbent automated decisioning model that corresponds to each respective synthetic model input dataset of the plurality of synthetic model input datasets. Furthermore, in such embodiments, the system or service implementing method 200 may function to compute, for each synthetic model input dataset, a model performance efficacy metric (e.g., estimated model benefit, etc.) and a model fairness efficacy metric (e.g., adverse impact ratio, etc.) for a subject candidate disparity-mitigating alternative model based on individually assessing model output data of the subject candidate disparity-mitigating alternative model that corresponds to each respective synthetic model input dataset of the plurality of synthetic model input datasets.

It shall be recognized that S240 may function to perform an analogous assessment for each candidate less discriminatory alternative machine learning model of the potential set of candidate less discriminatory alternative (LDA) machine learning models, as shown generally by way of example in FIG. 10. In other words, S240 may function to compute, on a per-synthetic model validation dataset basis, a model performance efficacy metric (e.g., model benefit metric, AUC, etc.) and a model fairness efficacy metric (e.g., adverse impact ratio, etc.) for a subject incumbent automated decisioning model and each of a plurality of candidate disparity-mitigating alternative models generated for the subject incumbent automated decisioning model based on assessing model output data that corresponds to each respective synthetic model validation dataset (e.g., synthetic model input dataset).

Scoring Candidate LDA Models

Additionally, in one or more embodiments, a system or service implementing the method 200 may function to (e.g., automatically) compute a less discriminatory alternative viability score (e.g., disparity-mitigating model viability score, LDA model viability score or the like) for each candidate less discriminatory machine learning model of the potential set of candidate less discriminatory alternative machine learning models. Stated another way, in one or more embodiments, based on assessing a model performance of the target incumbent model against a model performance of a subject candidate less discriminatory alternative machine learning model across n-number of synthetic datasets (e.g., a selective subset of synthetic model input datasets, all synthetic model input datasets generated by S230), S240 may function to compute a less discriminatory alternative (model) viability score (e.g., disparity-mitigating model viability score) that may represent a quantitative measure of how often the subject candidate less discriminatory alternative machine learning model performed better than the target incumbent machine learning model with respect to one or more of model fairness, model performance, model accuracy, and/or a combination of model fairness, model performance, and model accuracy across the n-number of synthetic datasets (e.g., a selective subset of synthetic model input datasets, all synthetic model input datasets generated by S230).

For instance, with continued reference to the above non-limiting example, in one or more embodiments, S240 may function to compute a less discriminatory alternative (model) viability score of one-hundred for the first candidate less discriminatory alternative machine learning model of the potential set of candidate less discriminatory machine learning models based on the system or service implementing the method 200 identifying that the first candidate less discriminatory alternative machine learning model performs better across each (e.g., one-hundred percent) of the n-number of synthetic model input datasets generated by S230 when compared to the incumbent model. Stated another way, in one or more embodiments, S240 may function to automatically compute, via one or more computers, a disparity-mitigating model viability score of one-hundred (100) for the first candidate less discriminatory alternative machine learning model based on automatically performing, via the one or more computers, a first set of pairwise assessments between the model performance efficacy metric computed for the incumbent automated decisioning model and the model performance efficacy metric computed for the first candidate disparity-mitigating alternative model (e.g., first candidate less discriminatory alternative machine learning model) across the plurality of synthetic model input datasets and a second set of pairwise assessments between the model fairness efficacy metric computed for the incumbent automated decisioning model and the model fairness efficacy metric computed for the first candidate disparity-mitigating alternative model (e.g., first candidate less discriminatory alternative machine learning model) across the plurality of synthetic model input datasets.

Additionally, or alternatively, with continued reference to the above non-limiting example, in one or more embodiments, S240 may function to compute a less discriminatory alternative (model) viability score of seventy-five for the second candidate less discriminatory alternative machine learning model of the potential set of candidate less discriminatory machine learning models based on the system or service implementing the method 200 identifying that second candidate less discriminatory alternative machine learning model performs better across three-quarters (e.g., seventy-five percent) of the n-number of synthetic model input datasets generated by S230 when compared to the incumbent model. Stated another way, in one or more embodiments, S240 may function to automatically compute, via one or more computers, a disparity-mitigating model viability score of seventy-five (75) for the second candidate less discriminatory alternative machine learning model based on automatically performing, via the one or more computers, a first set of pairwise assessments between the model performance efficacy metric computed for the incumbent automated decisioning model and the model performance efficacy metric computed for the second candidate disparity-mitigating alternative model (e.g., second candidate less discriminatory alternative machine learning model) across the plurality of synthetic model input datasets and a second set of pairwise assessments between the model fairness efficacy metric computed for the incumbent automated decisioning model and the model fairness efficacy metric computed for the second candidate disparity-mitigating alternative model (e.g., second candidate less discriminatory alternative machine learning model) across the plurality of synthetic model input datasets.

Additionally, or alternatively, with continued reference to the above non-limiting example, in one or more embodiments, S240 may function to compute a less discriminatory alternative (model) viability score of twenty-five for the third candidate less discriminatory alternative machine learning model of the potential set of candidate less discriminatory machine learning models based on the system or service implementing the method 200 identifying that third candidate less discriminatory alternative machine learning model performs better across a quarter (e.g., twenty-five percent) of the n-number of synthetic datasets generated by S230 when compared to the incumbent model. Stated another way, in one or more embodiments, S240 may function to automatically compute, via one or more computers, a disparity-mitigating model viability score of twenty-five (25) for the third candidate less discriminatory alternative machine learning model based on automatically performing, via the one or more computers, a first set of pairwise assessments between the model performance efficacy metric computed for the incumbent automated decisioning model and the model performance efficacy metric computed for the third candidate disparity-mitigating alternative model (e.g., third candidate less discriminatory alternative machine learning model) across the plurality of synthetic model input datasets and a second set of pairwise assessments between the model fairness efficacy metric computed for the incumbent automated decisioning model and the model fairness efficacy metric computed for the third candidate disparity-mitigating alternative model (e.g., third candidate less discriminatory alternative machine learning model) across the plurality of synthetic model input datasets.

Additionally, or alternatively, with continued reference to the above non-limiting example, in one or more embodiments, S240 may function to compute a less discriminatory alternative viability score of zero for the nth candidate less discriminatory alternative machine learning model of the potential set of candidate less discriminatory machine learning models based on the system or service implementing the method 200 identifying that nth candidate less discriminatory alternative machine learning model does not perform better than the target incumbent machine learning model on any of the n-number of synthetic datasets generated by S230. Stated another way, in one or more embodiments, S240 may function to automatically compute, via one or more computers, a disparity-mitigating model viability score of zero (o) for the n-th candidate less discriminatory alternative machine learning model based on automatically performing, via the one or more computers, a first set of pairwise assessments between the model performance efficacy metric computed for the incumbent automated decisioning model and the model performance efficacy metric computed for the n-th candidate disparity-mitigating alternative model (e.g., n-th candidate less discriminatory alternative machine learning model) across the plurality of synthetic model input datasets and a second set of pairwise assessments between the model fairness efficacy metric computed for the incumbent automated decisioning model and the model fairness efficacy metric computed for the n-th candidate disparity-mitigating alternative model (e.g., n-th candidate less discriminatory alternative machine learning model) across the plurality of synthetic model input datasets.

Ranking Candidate LDA Models

Additionally, in one or more embodiments, a system or service implementing the method 200 may function to generate a ranked list of the candidate less discriminatory alternative machine learning models based on their respective less discriminatory alternative (model) viability score (e.g., disparity-mitigating model viability score)

For instance, in a non-limiting example, the system or service may rank the candidate less discriminatory alternative machine learning models in descending order with the candidate machine learning model that corresponds to the highest less discriminatory alternative viability score (e.g., disparity-mitigating model viability score) ranked first.

It shall be noted that, in one or more embodiments, the system or service implementing the method 200 may function to generate the ranked list of the candidate less discriminatory alternative machine learning models based on additional and/or different model ranking criteria without departing from the scope of the present disclosure.

2.50 Surfacing Candidate LDA Models

S250, which includes surfacing candidate less discriminatory alternative machine learning models, may function to surface the potential set of candidate less discriminatory alternative machine learning models in association with one or more model efficacy metrics to a target subscriber associated with the target incumbent machine learning model.

Figure 11:
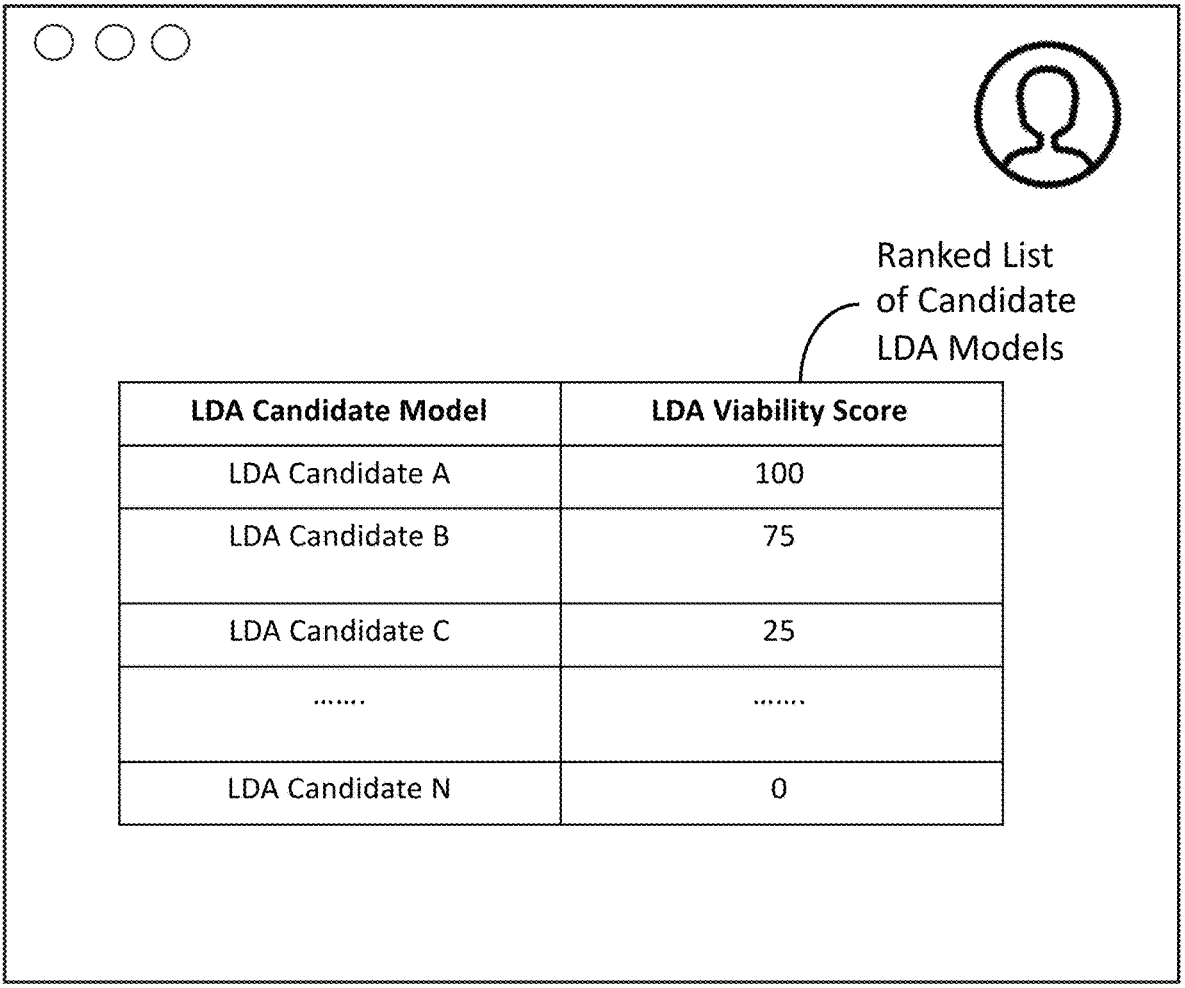
FIG. 11 illustrates an example graphical user interface displaying a ranked list of candidate less discriminatory alternative machine learning models in accordance with one or more embodiments of the present application.

In one or more embodiments, S250 may function to display, via a graphical user interface, a matrix of candidate less discriminatory alternative machine learning models based on their less discriminatory alternative viability score (e.g., in a descending order, the candidate less discriminatory machine learning model with the highest less discriminatory alternative viability score is positioned at the top of the matrix and the candidate less discriminatory machine learning model with the lowest less discriminatory alternative viability score is positioned at the bottom of the matrix), as shown generally by way of example in FIG. 11. Additionally, in some embodiments, for each distinct candidate less discriminatory machine learning model included in the matrix, S250 may function to display the corresponding model performance efficacy metrics and/or less discriminatory alternative viability score.

It shall be recognized that, in one or more embodiments, a target subscriber may function to select a model representation that corresponds to one of the candidate less discriminatory alternative machine learning models included in the matrix of candidate less discriminatory alternative machine learning models. Accordingly, based on the system or service implementing method 200 receiving the selection, the system or service may function to transmit the candidate less discriminatory alternative machine learning model that corresponds to the selected representation to the target subscriber that, in turn, the target subscriber may function to implement the candidate less discriminatory alternative machine learning model within the target subscriber's system or service.

Stated differently, in one or more embodiments, based on a system or service implementing the method 200 generating the ranked list of the candidate less discriminatory alternative machine learning models, S250 may function to display the ranked list of candidate less discriminatory alternative machine learning models on a graphical user interface that may be accessible by a target subscriber. At least one technical benefit of displaying the ranked list of candidate less discriminatory alternative machine learning models may enable the target subscriber to identify a less discriminatory alternative machine learning model that satisfies their model performance and fairness objectives.

In one or more embodiments, a system or service implementing method 200 may function to replace an incumbent automated decisioning model of an automated decisioning system of a subscriber with a candidate disparity-mitigating alternative model to mitigate bias in the automated decisioning system based on the disparity-mitigating model viability score computed for the candidate disparity-mitigating alternative model satisfying a minimum bias-mitigating efficacy value.

In one or more embodiments, a system or service implementing method 200 may function to automatically generate, via one or more computers, one or more pieces of evidence based on the disparity-mitigating model viability score computed for a candidate disparity-mitigating alternative model. In such embodiments, each piece of evidence of the one or more pieces of evidence may include a rationale (e.g., textual rationale, graphical rationale, etc.) describing a reason that the candidate disparity-mitigating alternative model outperforms a target incumbent automated decisioning model with respect to bias mitigation. Furthermore, in such embodiments, the system or service may function to display, via a graphical user interface, the one or more pieces of evidence to a subscriber associated with the target incumbent automated decisioning model.

Additionally, or alternatively, in one or more embodiments, the graphical user interface may include a selectable user interface element that, when selected, elects the candidate disparity-mitigating alternative model as a replacement or a successor to the target incumbent automated decisioning model. Furthermore, in one or more embodiments, based on or in response to receiving, via the graphical user interface, a user input selecting the selectable user interface element, the system or service may identify the candidate disparity-mitigating alternative model as a replacement or a successor to the target incumbent automated decisioning model and/or replace the target incumbent automated decisioning model with the candidate disparity-mitigating alternative model.

In one or more embodiments, the system or service may function to display, via a graphical user interface, a representation of a candidate disparity-mitigating alternative model in association with a disparity-mitigating model viability score computed for the candidate disparity-mitigating alternative model. In such embodiments, the graphical user interface may be accessible by a subscriber that is currently implementing an incumbent automated decisioning model in a production environment of the subscriber and for which the candidate disparity-mitigating alternative model was generated. Accordingly, in such embodiments, the graphical user interface may enable the subscriber to determine whether replacement of the incumbent automated decisioning model with the candidate disparity-mitigating alternative model is needed.

For instance, in a non-limiting example, if the disparity-mitigating model viability score computed for the candidate disparity-mitigating alternative model indicates that the candidate disparity-mitigating alternative model does not mitigate disparity as effectively as the incumbent automated decisioning model, the subscriber may forgo executing a model replacement process based on the disparity-mitigating model viability score failing to satisfy a predetermined minimum disparity-mitigating model viability score threshold (e.g., the model replacement process when executed, replaces the incumbent automated decisioning model with the candidate disparity-mitigating alternative model).

In another non-limiting example, if the disparity-mitigating model viability score computed for the candidate disparity-mitigating alternative model indicates that the candidate disparity-mitigating alternative model mitigates disparity better than the incumbent automated decisioning model, the subscriber may execute a model replacement process based on the disparity-mitigating model viability score satisfying a predetermined minimum disparity-mitigating model viability score threshold (e.g., the model replacement process when executed replaces the incumbent automated decisioning model with the candidate disparity-mitigating alternative model).

It shall be further recognized that, in one or more embodiments, when the system or service determines that an actual less discriminatory alternative machine learning model to the target incumbent machine learning model does not exist, the system or service may function to generate one or more pieces of evidence (e.g., graphical content, textual content, and/or the like) that includes a rationale describing how the target incumbent machine learning model operates optimally within the given subscriber constraints and parameters, and/or why a less discriminatory alternative machine learning model could not be identified.

At least one technical advantage of a system or service implementing the method 200 may enable subscribers to the system or service to systematically identify, assess, and rank candidate less discriminatory alternative machine learning models to a target incumbent machine learning model. This computer-implemented process aids in mitigating bias and discrimination (thus enhancing fairness) in subscribers' automated decisioning systems that use machine learning models while simultaneously maintaining or even improving the overall performance (e.g., estimated benefit, estimated profit, etc.) of these automated decisioning systems.

A practitioner skilled in the art will recognize that the above-mentioned process may not involve or require any direct interaction with a subscriber. In other words, the above-mentioned process may be instantiated automatically. Additionally, in some embodiments, the above-mentioned scoring process may not be directly computed from the results of the bootstrapping process. For instance, the above-mentioned scoring process may alternatively be an arbitrary process defined by a subscriber or interested party.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device, including a device which is connected directly to the machine in question or connected via a network connection. In addition, the computer-executable component may either be local to the user or instantiated remotely, as in a computation as a service system. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

As a person skilled in the art will recognize from the previous detailed description and from the figures and claims, the systems and methods described herein may be applied to the validation of any putative LDA, no matter whether it arises from a machine learning process, and no matter whether it be intended to underpin a decisioning mechanism, a ranking mechanism, a continuous estimation mechanism, or any other such system.

As a person skilled in the art will recognize from the above figures and claims, this computer-implemented validation process may be applied to any number of criteria, whether applied separately or jointly, using any kind of approval rule. So, for instance, in a non-limiting case this computer-implemented validation process (e.g., a system or service implementing the method 200) could be applied to determine if a pricing module increased the expected profitability of a loan book as well as the symmetric mean difference between the prices charged to different classes.

As a person skilled in the art will recognize from the above figures and claims, the extensions of this method to incorporate varying business conditions can be further extended to incorporate business rules which are not continuous but are discrete, are not independent among different terms, and/or are subject to any other form of parametrized or unparametrized modification, or any combination of these classes.

We claim:

1. A method of mitigating output bias in a computer-based decisioning system caused by an operation of an incumbent decisioning model, the method comprising:
at a model disparity mitigation service implemented by a network of distributed computers:
sourcing, from a memory, the incumbent decisioning model of a computer-based decisioning system used in a production environment of a subscriber;
identifying a plurality of distinct candidate disparity-mitigating decisioning models for mitigating an output bias of the computer-based decisioning system;
executing, by one or more computer processors, output bias testing of the incumbent decisioning model and the plurality of distinct candidate disparity-mitigating decisioning models using a corpus of computer-generated synthetic data samples as bias testing input, wherein executing the output bias testing includes:
computing, for each of the incumbent decisioning model and the plurality of distinct candidate disparity-mitigating decisioning models, at least a first model performance metric associated with a first objective function and at least a second model performance metric associated with a second objective function based on an input of the corpus of computer-generated synthetic data samples to the incumbent decisioning model and the plurality of distinct candidate disparity-mitigating decisioning models;
computing, by the one or more computers, a two-dimensional value for each predictive output of the incumbent decisioning model and the plurality of distinct candidate disparity-mitigating decisioning models based on the first model performance metric and the second model performance metric;
executing, by the one or more computers, a pairwise assessment between a first plurality of two-dimensional values for the incumbent decisioning model and a second plurality of two-dimensional values for at least one of the plurality of distinct candidate disparity-mitigating decisioning models, wherein the pairwise assessment includes identifying as a target pair a first two dimensional value of the first plurality of two-dimensional values and a second two-dimensional value of the second plurality of two-dimensional values that share a same bias testing input comprising a given synthetic data sample of the corpus of computer-generated synthetic data samples that was commonly inputted into the incumbent decisioning model and the at least one of the plurality of distinct candidate disparity-mitigating decisioning models;
generating, via a graphical user interface, a graphical visualization, of the first plurality of two-dimensional values and the second plurality of two-dimensional values, wherein the graphical visualization overlays bias and performance trade-offs for the incumbent decisioning model and the at least one of the plurality of distinct candidate disparity-mitigating decisioning models;
identifying a given candidate disparity-mitigating decisioning model of the plurality of distinct candidate disparity-mitigating decisioning models that, when executed, mitigates the output bias in the computer-based decisioning system; and
outputting, by the one or more computer processors, a recommendation for adapting the computer-based decisioning system by replacing the incumbent decisioning model with the given candidate disparity-mitigating decisioning model;
receiving, via the graphical user interface, a user input selecting the given candidate disparity-mitigating decisioning model from the plurality of distinct candidate disparity-mitigating decisioning models; and
in response to receiving the user input selection, replacing the incumbent decisioning model with the given candidate disparity-mitigating decisioning model thereby improving decisioning outputs of the computer-based decisioning system.

2. The method according to claim 1, wherein the corpus of computer-generated synthetic data samples is generated by:
executing, by the one or more computers, a data synthesis algorithm configured to apply statistical sampling techniques that preserve distributional characteristics of fairness-sensitive attributes in the bias test input, wherein the data synthesis algorithm ensures representation of minority and majority class attributes in the corpus of computer-generated synthetic data samples.

3. The method according to claim 1, wherein executing the pairwise assessment comprises:
comparing, by the one or more computer processors, the first two-dimensional value and the second two-dimensional value using a predefined metric computation rule that evaluates differences in prediction accuracy and bias mitigation between the incumbent decisioning model and the at least one of the plurality of distinct candidate disparity-mitigating decisioning models.

4. The method according to claim 1, wherein executing the pairwise assessment further comprises:
computing, for each pairwise comparison, a model performance efficacy metric and a model fairness efficacy metric for the incumbent decisioning model and the at least one candidate disparity-mitigating decisioning model based on model output data corresponding to each synthetic model input dataset;
identifying a subset of the pairwise comparisons in which the candidate disparity-mitigating decisioning model exhibits improved fairness efficacy without a statistically reduction in performance efficacy; and
generating a graphical visualization of the subset of pairwise comparisons, wherein the graphical visualization overlays model fairness efficacy metrics and estimated benefit efficacy metrics illustrating the trade-offs between fairness improvement and decisioning model performance.

5. The method according to claim 1, wherein executing the pairwise assessment further comprises:
computing a divergence metric for each pairwise comparison between the first plurality of two-dimensional values and the second plurality of two-dimensional values, wherein the divergence metric comprises a Jensen-Shannon divergence metric computed between predictive output distributions of the incumbent decisioning model and the at least one of the plurality of distinct candidate disparity-mitigating decisioning models.

6. The method according to claim 5, wherein identifying the given candidate disparity-mitigating decisioning model includes:
ranking the plurality of distinct candidate disparity-mitigating decisioning models based on a disparity-mitigating model viability score, wherein the disparity-mitigating model viability score is computed using the Jensen-Shannon divergence metric to compare probability distributions of predictive outputs between the incumbent decisioning model and each of the plurality of distinct candidate disparity-mitigating decisioning model; and
identifying the given candidate disparity-mitigating decisioning model with a given disparity-mitigating model viability score that is highest as a most effective model for mitigating bias output in the computer-based decisioning system.

7. The method according to claim 1, further comprising:
generating, by the one or more computer processors, a sensitivity digital artifact for each candidate disparity-mitigating decisioning model, wherein the sensitivity digital artifact quantifies variations in fairness metrics and performance metrics relative to changes in input data distribution, and
using the sensitivity digital artifact to identify a robust candidate disparity-mitigating decisioning model with reduced susceptibility to input data variations.

8. The method according to claim 1, wherein the recommendation for adapting the computer-based decisioning system includes:
generating a deployment readiness score based on model interpretability metrics and computational efficiency metrics, and
ranking the plurality of distinct candidate disparity-mitigating decisioning models according to the deployment readiness score and outputting a ranked list of the plurality of distinct candidate disparity-mitigating decisioning models.

9. A computer-implemented method for mitigating output bias in a computer-based decisioning system caused by an operation of an incumbent decisioning model, the method comprising:
receiving, by a processor, a model input dataset and the incumbent decisioning model deployed in a production environment;
generating, by the processor, a plurality of synthetic datasets using a configured resampling algorithm stored in memory, wherein the resampling algorithm, when executed by the processor, applies statistical bootstrapping that preserve fairness-sensitive attributes of the model input dataset;
executing, by the processor, the incumbent decisioning model and at least one candidate alternative decisioning model on one or more of the plurality of synthetic datasets to produce output predictions;
computing, by the processor, at least one fairness metric and at least one performance metric for each of the incumbent decisioning model and the at least one candidate alternative decisioning model based on the output predictions, wherein the at least one fairness metric includes one or more quantitative measures of adverse impact, disparate treatment, and classification parity;
comparing, by the processor, the at least one fairness metric and the at least one performance metric of the incumbent decisioning model and of the at least one candidate alternative decisioning model using a pairwise computational framework that quantifies statistical bias deviations in predictive outputs;
generating, by the processor, a graphical visualization of trade-offs between bias mitigation and performance metrics for the incumbent decisioning model and the at least one candidate alternative decisioning model, wherein the graphical visualization overlays fairness and performance trade-offs to assist in model selection;
determining, by the processor, whether the at least one candidate alternative decisioning model satisfies a predefined fairness improvement threshold while maintaining a minimum performance requirement;
receiving, via a graphical user interface, a user input selecting the at least one candidate alternative decisioning model;
and in response to receiving the user input selection, transmitting, by the processor, a deployment recommendation signal to an automated system to replace the incumbent decisioning model with the at least one candidate alternative decisioning model when the fairness improvement threshold is satisfied.

10. The method according to claim 9, wherein the plurality of synthetic datasets is generated by:
executing, by the processor, a data synthesis algorithm configured to apply statistical sampling techniques that preserve distributional characteristics of fairness-sensitive attributes in the model input dataset, and
ensuring representation of minority and majority class attributes within the generated synthetic datasets to provide equitable bias testing inputs.

11. The method according to claim 9, wherein comparing the least one fairness metric and the at least one performance metric comprises:
using, by the processor, a predefined metric computation rule to evaluate differences in prediction accuracy and bias mitigation between the incumbent decisioning model and the at least one candidate alternative decisioning model.

12. The method according to claim 9, further comprising:
computing, for each pairwise comparison, a model performance efficacy metric and a model fairness efficacy metric for the incumbent decisioning model and the at least one candidate alternative decisioning model based on output predictions corresponding to the synthetic datasets;
identifying a subset of pairwise comparisons where the candidate alternative decisioning model exhibits improved fairness efficacy without degradation in performance efficacy; and
generating a graphical visualization of the identified subset of pairwise comparisons, overlaying fairness efficacy metrics and estimated performance trade-offs.

13. The method according to claim 9, wherein comparing the at least one fairness metric and the at least one performance metric further includes:
computing, by the processor, a divergence metric for each pairwise comparison between the incumbent decisioning model and the at least one candidate alternative decisioning model,
wherein the divergence metric includes a Jensen-Shannon divergence metric computed between the predictive output distributions.

14. The method according to claim 13, wherein determining whether the at least one candidate alternative decisioning model satisfies the fairness improvement threshold includes:
- ranking the candidate alternative decisioning models based on a disparity-mitigating model viability score, wherein the disparity-mitigating model viability score is computed using the Jensen-Shannon divergence metric to quantify statistical differences in predictive outputs, and
- and identifying the candidate alternative decisioning model with the highest viability score for deployment.

15. The method according to claim 9, further comprising:
- generating, by the processor, a sensitivity digital artifact for each candidate alternative decisioning model, wherein the sensitivity digital artifact quantifies variations in fairness metrics and performance metrics relative to changes in the model input dataset distribution, and
- using the sensitivity digital artifact to identify a robust candidate alternative decisioning model with reduced susceptibility to input data variations.

16. The method according to claim 9, wherein the deployment recommendation signal includes:
- generating a deployment readiness score for the at least one candidate alternative decisioning model based on model interpretability metrics and computational efficiency metrics; and
- ranking the candidate alternative decisioning models according to the deployment readiness score and outputting a ranked list.

17. A system for mitigating output bias in a computer-based decisioning system caused by an operation of an incumbent decisioning model, the system comprising:
- a memory storing the incumbent decisioning model, a plurality of distinct candidate disparity-mitigating decisioning models, and a corpus of computer-generated synthetic data samples;
- a processor configured to:
  - source, from the memory, the incumbent decisioning model deployed in a production environment of a subscriber;
  - identify the plurality of distinct candidate disparity-mitigating decisioning models for mitigating output bias in the computer-based decisioning system;
  - execute output bias testing of the incumbent decisioning model and the plurality of distinct candidate disparity-mitigating decisioning models using the corpus of computer-generated synthetic data samples as bias testing input, wherein executing the output bias testing includes:
    - computing, for each of the incumbent decisioning model and the plurality of distinct candidate disparity-mitigating decisioning models, at least a first model performance metric associated with a first objective function and at least a second model performance metric associated with a second objective function based on the input of the corpus of computer-generated synthetic data samples;
    - computing a two-dimensional value for each predictive output of the incumbent decisioning model and the plurality of distinct candidate disparity-mitigating decisioning models based on the first model performance metric and the second model performance metric;
  - execute a pairwise assessment between a first plurality of two-dimensional values for the incumbent decisioning model and a second plurality of two-dimensional values for at least one of the plurality of distinct candidate disparity-mitigating decisioning models, wherein the pairwise assessment includes identifying as a target pair a first two-dimensional value of the first plurality of two-dimensional values and a second two-dimensional value of the second plurality of two-dimensional values that share a same bias testing input comprising a given synthetic data sample;
  - generating, via a graphical user interface, a graphical visualization, of the first plurality of two-dimensional values and the second plurality of two-dimensional values, wherein the graphical visualization overlays bias and performance trade-offs for the incumbent decisioning model and the at least one of the plurality of distinct candidate disparity-mitigating decisioning models;
  - identify a given candidate disparity-mitigating decisioning model of the plurality of distinct candidate disparity-mitigating decisioning models that, when executed, mitigates the output bias in the computer-based decisioning system;
  - output a recommendation for adapting the computer-based decisioning system by replacing the incumbent decisioning model with the given candidate disparity-mitigating decisioning model;
  - receiving, via the graphical user interface, a user input selecting the given candidate disparity-mitigating decisioning model from the plurality of distinct candidate disparity-mitigating decisioning models; and
  - in response to receiving the user input selection, replacing the incumbent decisioning model with the given candidate disparity-mitigating decisioning model to improve decisioning outputs of the computer-based decisioning system.

18. The system according to claim 17, wherein executing the pairwise assessment includes:
- computing, for each pairwise comparison, a model performance efficacy metric and a model fairness efficacy metric for the incumbent decisioning model and the at least one candidate disparity-mitigating decisioning model based on model output data corresponding to each synthetic model input dataset;
- identifying a subset of the pairwise comparisons in which the candidate disparity-mitigating decisioning model exhibits improved fairness efficacy without a statistically reduction in performance efficacy; and
- generating a graphical visualization of the subset of pairwise comparisons, wherein the graphical visualization overlays model fairness efficacy metrics and estimated benefit efficacy metrics illustrating the trade-offs between fairness improvement and decisioning model performance.

* * * * *